United States Patent [19]
Yamamoto

[11] Patent Number: 5,555,231
[45] Date of Patent: Sep. 10, 1996

[54] INFORMATION RECORDING METHOD, METHOD FOR REPRODUCING RECORDED INFORMATION, AND APPARATUS THEREFOR

[75] Inventor: Masakuni Yamamoto, Yamato, Japan

[73] Assignee: Canon Kabushiki Kaisha, Tokyo, Japan

[21] Appl. No.: 283,895

[22] Filed: Aug. 3, 1994

Related U.S. Application Data

[63] Continuation of Ser. No. 968,302, Oct. 29, 1992, abandoned.

[30] Foreign Application Priority Data

Oct. 31, 1991 [JP] Japan .................................. 3-311373

[51] Int. Cl.⁶ ........................................ G11B 7/00
[52] U.S. Cl. ........................ 369/100; 369/54; 369/122; 369/58
[58] Field of Search ........................ 369/99, 100, 275.1, 369/275.3, 275.4, 275.2, 111, 122, 59, 48, 58, 60, 54

[56] References Cited

U.S. PATENT DOCUMENTS

| | | | |
|---|---|---|---|
| 4,553,228 | 11/1985 | Gerard et al. | 369/275.2 |
| 4,674,081 | 6/1987 | Gerard et al. | 369/275.3 |
| 4,685,096 | 8/1987 | Romeas | 369/275.4 |
| 4,985,881 | 1/1991 | Saito et al. | 369/275.2 |
| 4,999,828 | 3/1991 | Pollen et al. | 369/59 |
| 5,003,526 | 3/1991 | Bailey | 369/59 |
| 5,070,492 | 12/1991 | Ogawa et al. | 369/47 |

FOREIGN PATENT DOCUMENTS

| | | |
|---|---|---|
| 0318593 | 6/1989 | European Pat. Off. . |
| 0360674 | 3/1990 | European Pat. Off. . |
| 0376626 | 7/1990 | European Pat. Off. . |
| 0376673 | 7/1990 | European Pat. Off. . |
| 02-172039 | 7/1990 | Japan . |

*Primary Examiner*—Viet Q. Nguyen
*Attorney, Agent, or Firm*—Fitzpatrick, Cella, Harper & Scinto

[57] ABSTRACT

Information represented by an arrangement of codes of three or more kinds is recorded on a recording medium having a track in the following manner. The codes of the information are caused to correspond to information pits of three or more kinds respectively. The information pit corresponding to each code is formed on the track so as to be arranged along the track. Each information pit is recognized by the length thereof along the longitudinal direction of the track and the distance between the center of the pit in the longitudinal direction of the track and a reference position determined by a reference clock.

25 Claims, 17 Drawing Sheets

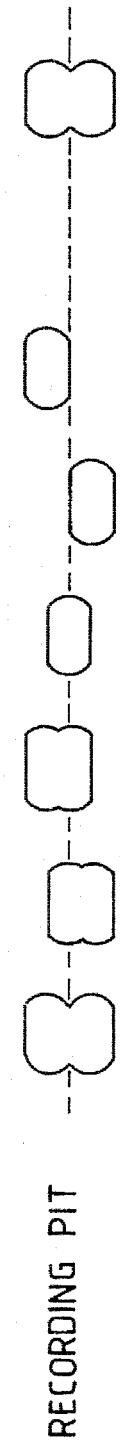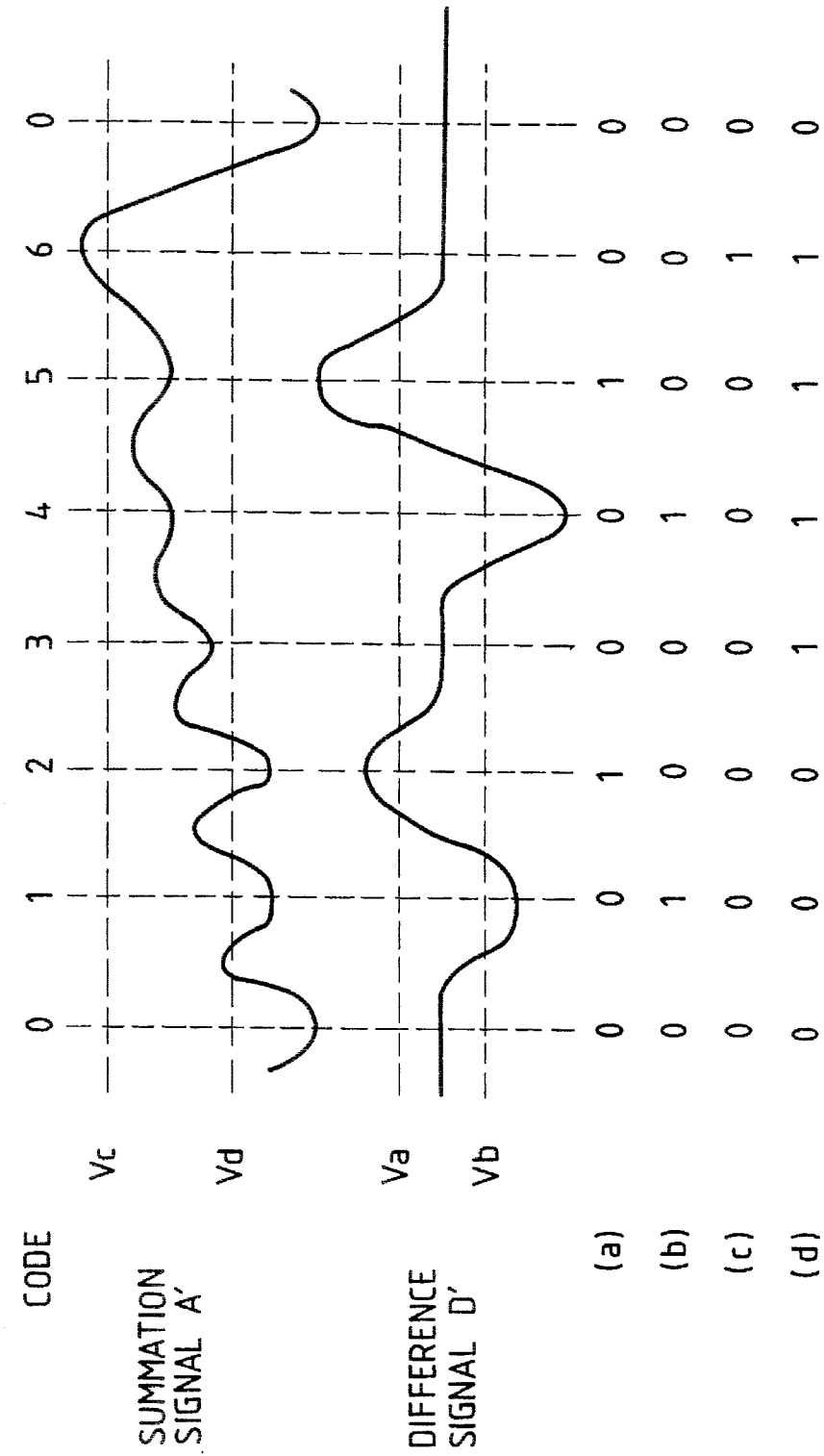
FIG. 4 (PRIOR ART)

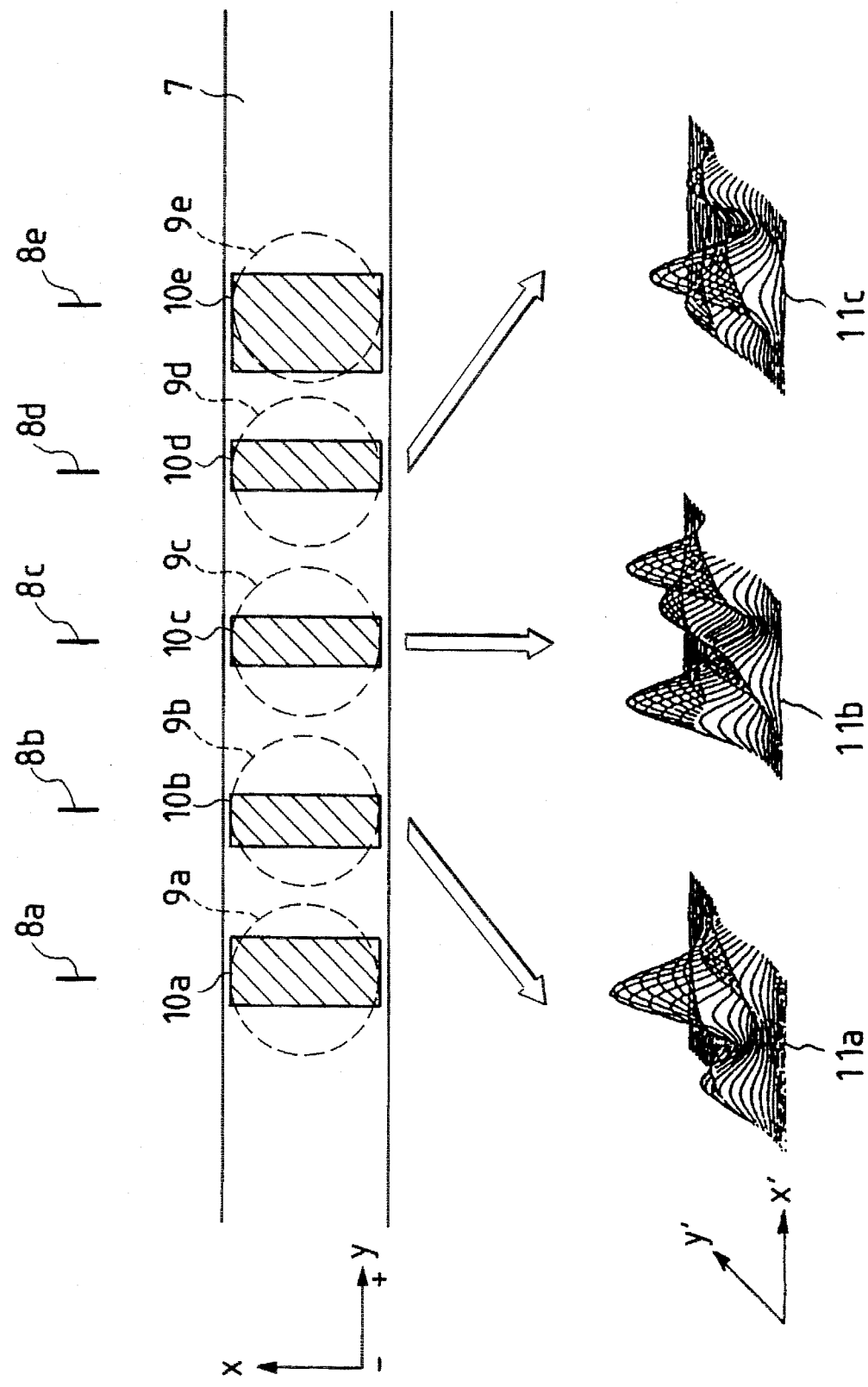

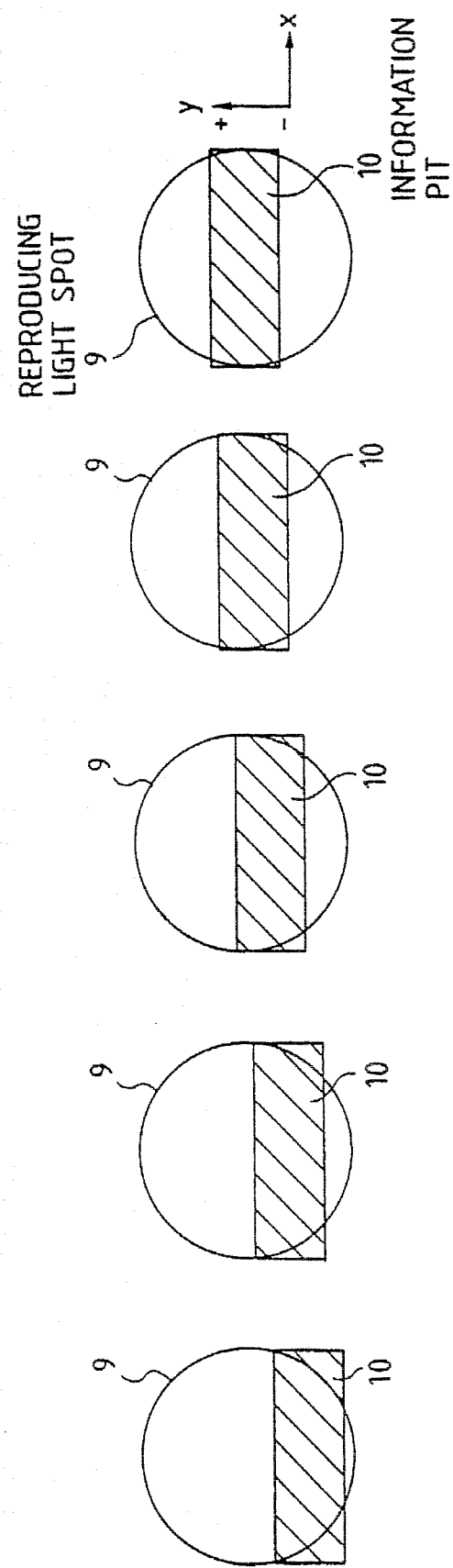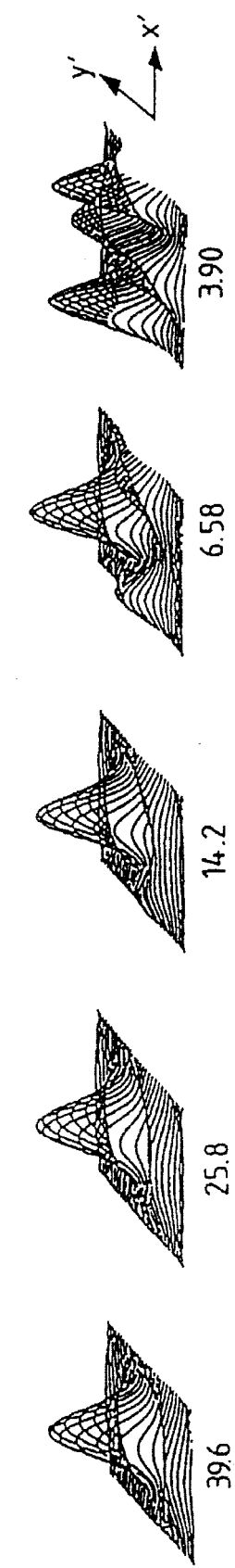
FIG. 8A1, FIG. 8A2, FIG. 8B1, FIG. 8B2, FIG. 8C1, FIG. 8C2, FIG. 8D1, FIG. 8D2, FIG. 8E1, FIG. 8E2

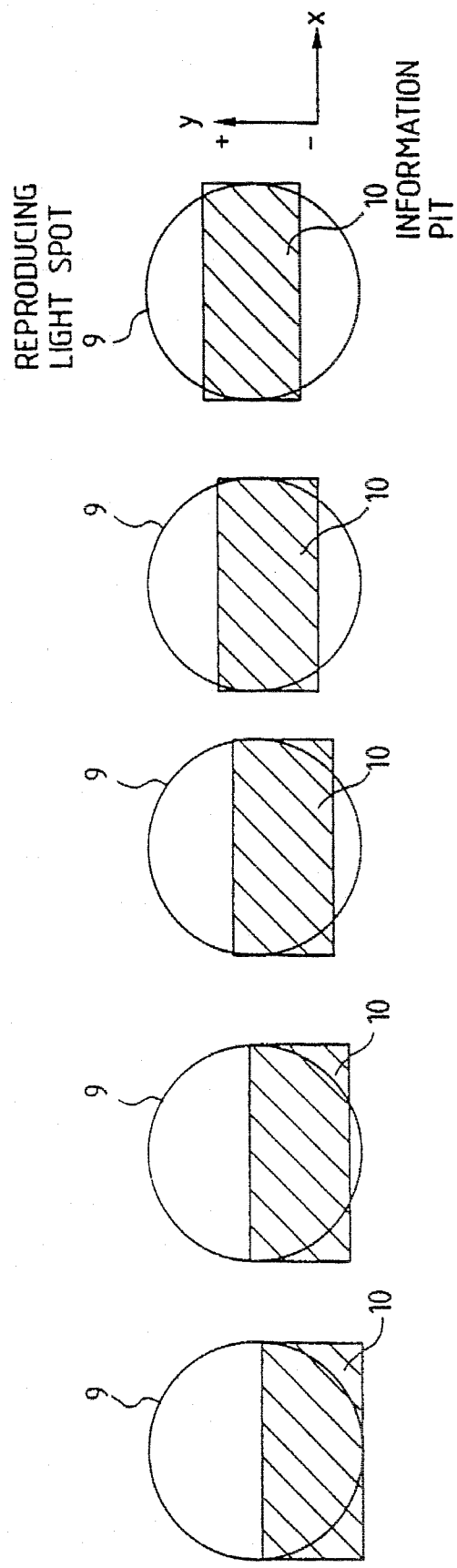
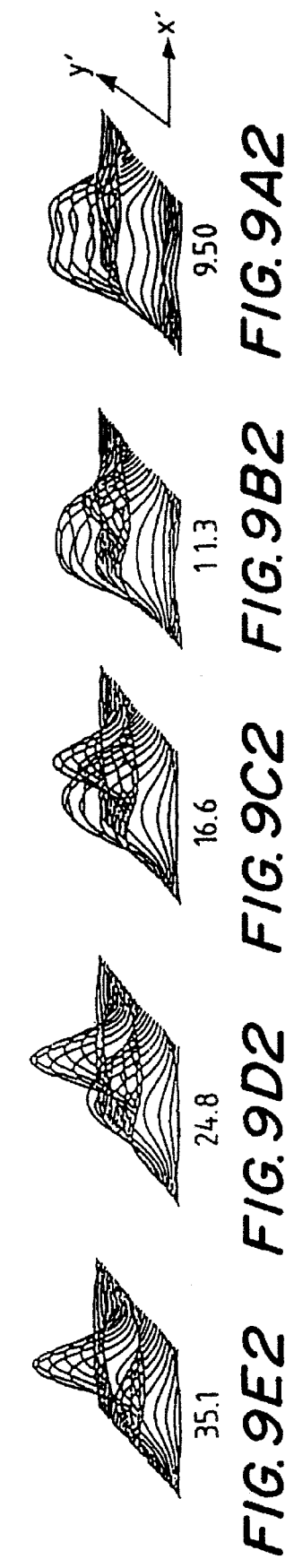
FIG.9A1 FIG.9A2
FIG.9B1 FIG.9B2
FIG.9C1 FIG.9C2
FIG.9D1 FIG.9D2
FIG.9E1 FIG.9E2

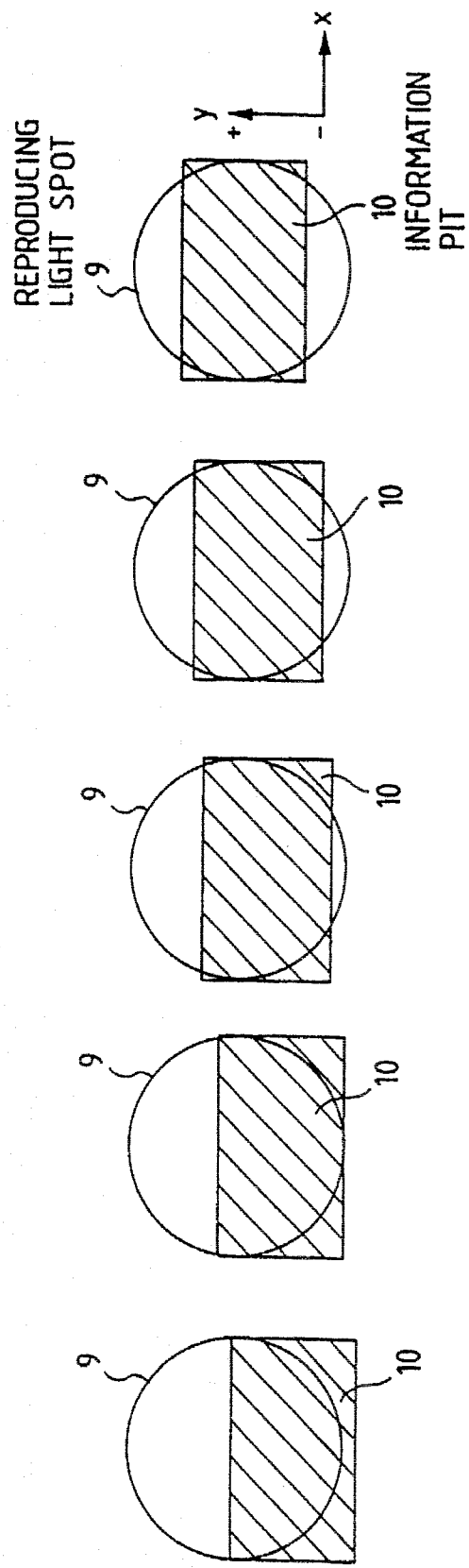
FIG.10A1 FIG.10A2
FIG.10B1 FIG.10B2
FIG.10C1 FIG.10C2
FIG.10D1 FIG.10D2
FIG.10E1 FIG.10E2

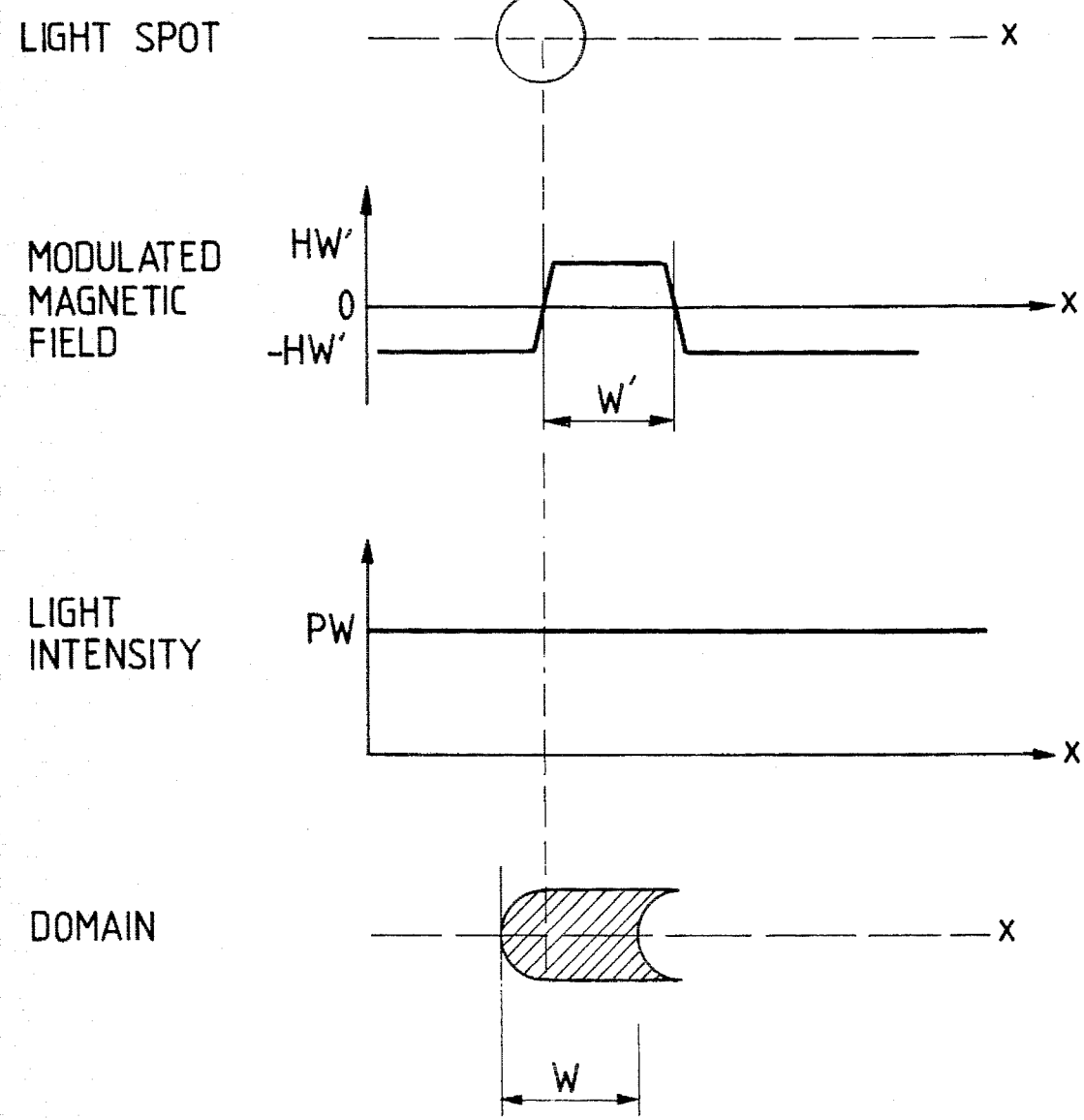

INFORMATION RECORDING METHOD, METHOD FOR REPRODUCING RECORDED INFORMATION, AND APPARATUS THEREFOR

This application is a continuation of prior U.S. patent application Ser. No. 07/968,302 filed Oct. 29, 1992, now abandoned.

BACKGROUND OF THE INVENTION

1. Field of the Invention

The present invention relates to a method for recording information, represented by the arrangement of codes of three or more kinds, on a recording medium having a track, a method for reproducing the recorded information from said medium, and an apparatus therefor.

2. Related Background Art

The optical memory industry has shown growth in recent years, and the recording media has been expanded from the optical video disks and compact disks for reproduction only to the add-on optical disks utilizing thin metal films or recording dye materials. The research and development at present are directed toward rewritable optical disks utilizing a magnetooptical recording method or phase transition recording method. Also, the application is being expanded from consumer products to the external memories of computers. In such optical memory apparatus, important are control technology for causing a small light spot to follow a desired track, and recording/reproducing technology enabling high density recording and high-speed information reading, and various proposals have been made regarding such control technology and recording/reproducing technology, in relation to the progress in the optical disks. As an example, an optical information recording/reproducing method for high density recording and high-speed information reading, and an apparatus therefor are disclosed in Japanese Patent Application Laid-open No. 2-172039. The details of this patent application will be explained in the following, with reference to the attached drawings.

At first, FIG. 1 shows information pits formed on an optical disk. Said pits are formed as recesses or projections on an information track, with a depth or a height equal to ¼ of the wavelength of the information reading laser beam. Said information pits are recorded in seven different manners, according to the number of unit pits and the positions in the transverse direction of the track. Consequently the information is recorded by multi-value recording of 7 values, corresponding to codes 0–6. More specifically, the center of the unit pit can assume three positions in the transverse direction of the track, namely a position on the center of the track and positions displaced from said center by about ½ of the width of the unit pit. A code 0 is represented by two units pits recorded at left and right with respect to the center of the track. A code 1 is represented by shifting the center position of the above-mentioned information pits to the center position at left, while a code 2 is represented by shifting to the center position at right. A code 3 is represented by a unit pit recorded at the track center, while a code 4 is represented by a unit pit at the center position at left, and a code 5 is represented by a unit pit at the center position at right. A code 6 is represented by the absence of a recorded pit.

An apparatus for such multi-value recording will be explained in the following, with reference to FIG. 2, in which shown are a code conversion circuit 102, a laser driving circuit 103, a laser 104, an actuator 105, an optical disk 108, and a spindle motor 109. Recording data 101 are converted, in the code conversion circuit 102, into information of the combination of the center position of the pit in the transverse direction of the track and of the pit width (number of unit pits). Said information is interpreted as the position of a unit pit in the transverse direction of the track and the presence or absence of said unit pit. In the information recording, a same track is scanned by a light beam spot by the number of positions of said unit pit with altered tracking positions, and unit pits are recorded in the scanning at each unit pit position, according to the information indicating the position of the unit pit in the transverse direction and the presence or absence of the unit pit. For example, in the 7-value recording shown in FIG. 1, the same track is scanned three times as the unit pit can assume three positions. Therefore, in each scanning, the actuator 105 is given a unit pit position signal 107 indicating an offset of 0 or ±, whereby the scanning position is set at the track center or displaced therefrom in the + or − direction by about ½ of the width of the unit pit. Then the laser driving circuit 103 is given a signal 106 indicating the presence or absence of a unit pit in this scanning position, whereby the intensity of the laser beam from the laser 104 is varied to form information pits as shown in FIG. 1, on a recording surface of the optical disk 108 maintained in rotation by the spindle motor 109.

FIG. 3 shows an apparatus for reproducing the information of the thus formed 7-value recording, wherein shown are a laser 110, an objective lens 111, a two-divided photo-detector 113, amplifiers 114, 115, a subtractor 116, an adder 117, comparators 118a–118d, and an encoder 119. A difference signal D' obtained from the subtractor 116 is supplied to the comparators 118a, 118b and is compared with reference voltages Va, Vb. Also, a sum signal A' obtained from the adder 111 is supplied to the comparators 118c, 118d and is compared with reference voltages Vc, Vd. Output signals from said comparators are converted by the encoder 119 into reproduced information 120.

In the following, the function of the information reproducing apparatus shown in FIG. 3 will be explained in further detail, with reference to a timing chart shown in FIG. 4. Referring to FIG. 4, the sum signal A' indicates the presence or absence of a pit and a width thereof. Said signal becomes lower than the reference voltage Vc in the presence of a pit, and becomes lower than the reference voltage Vd when the pit width is larger than the width of the unit pit, as in the code 0, 1 or 2. A binary signal (c) can be obtained by slicing the sum signal at Vc and giving a value "1" to a signal level equal to or higher than Vc. Also a binary signal (d) can be obtained by slicing said signal at Vd and giving a value "1" to a signal level equal to or higher than Vd. Also, the difference signal D' indicates the pit position. If the pit is symmetrical with respect to the track center or is totally absent, the difference signal D' is positioned between the reference voltages Va and Vb. The difference signal D' becomes higher than the reference voltage Va when the center of the pit in the transverse direction of the track is displaced upwards from the track center (code 2 or 5), and said signal D' becomes lower than the reference Voltage Vb when the center of pit is displaced downwards (code 1 or 4). Thus, a binary signal (a) can be obtained by slicing said difference signal at Va and giving a value "1" to a signal level equal to or higher than Va, and a binary signal (b) can be obtained by slicing at Vb and giving a value "1" to a signal level equal to or higher than Vb. The reproduced information can be obtained by supplying the binary signals (a), (b), (c) and (d) to the encoder and detecting a code corresponding to the combination of said binary signals to decode the code.

The above-explained recording method, and the apparatus for information recording and reproduction provide the advantages of enabling multi-value recording, thereby drastically increasing the recording density and also enabling high-speed reading of the information recorded with a high density. However, in the above-explained apparatus, the number of multiple values is limited because the information recording is based on the combination of information pits in the transverse direction of the track. Although said number can be increased, through the increase in the number of combinations, by an increase in the number of center positions of the unit pit in said transverse direction, the recording speed becomes inevitably lower as the number of light beam scannings accordingly increases at the information recording, and this fact is also a limiting factor of the number of multiple values.

SUMMARY OF THE INVENTION

In consideration of the foregoing, the object of the present invention is to provide a method for recording information, represented by the arrangement of codes of three or more kinds, on a recording medium in a simple manner and within a short time, a method for reproducing thus recorded information, and an apparatus therefor.

The above-mentioned object can be attained, according to a first embodiment of the present invention, by a method for recording information, represented by the arrangement of codes of three or more kinds, on a recording medium having a track, comprising steps of:

making the codes of said information to respectively correspond to information pits of three or more kinds; and forming the information pits corresponding to the codes on the recording medium, in an arrangement along the track, wherein the information pits of different kinds can be mutually identified by the length along the longitudinal direction of the track, and the distance along the longitudinal direction of the track between the center of a pit on the recording medium and a reference position determined on the medium according to a reference clock signal.

Also, the above-mentioned object can be attained, according to a second embodiment of the present invention, by a method for recording information, represented by the arrangement of codes of three or more kinds, on a recording medium having a track, comprising steps of:

setting, on said track, reference positions of a predetermined interval corresponding to a reference clock signal; and recording information pits, corresponding to the codes of said information, respectively on said reference positions, wherein the information pits corresponding to different codes are mutually different in the length along the longitudinal direction of the track and the amount of shift from the reference position to the center position in the longitudinal direction of the track.

Also, the above-mentioned object can be attained, according to the present invention, by a method for reproducing information from a recording medium bearing an arrangement, along a track, of information pits of three or more kinds which are mutually different in the length along the longitudinal direction of the track and in the amount of shift from a reference position corresponding to a reference clock signal to the center position in the longitudinal direction of the track, comprising steps of:

scanning said track with a light spot;

detecting, in synchronization with said reference clock signal, the light amount distribution of the reflected or transmitted light when the information pit is irradiated by the light spot; and reproducing information by identifying the kind of information pits based on the detected light amount distribution.

Also, the above-mentioned object can be attained, according to the present invention, by an apparatus for reproducing information from a recording medium bearing an arrangement, along a track, of information pits of three or more kinds which are mutually different in the length along the longitudinal direction of the track and in the amount of shift from a reference position corresponding to a reference clock signal to the center position in the longitudinal direction of the track, comprising:

means for scanning said track with a light spot;

a photodetector for detecting, in synchronization with said reference clock signal, the light amount distribution of the reflected or transmitted light when the information pit is irradiated by the light spot; and an information recognition circuit for reproducing the information by identifying the kinds of the information pits based on the detected light amount distribution.

BRIEF DESCRIPTION OF THE DRAWINGS

FIG. 4 is a chart showing the reproducing operation in the information reproducing apparatus shown in FIG. 3;

FIG. 6 is a schematic view showing an embodiment of the information recording method of the present invention;

Figure 11:
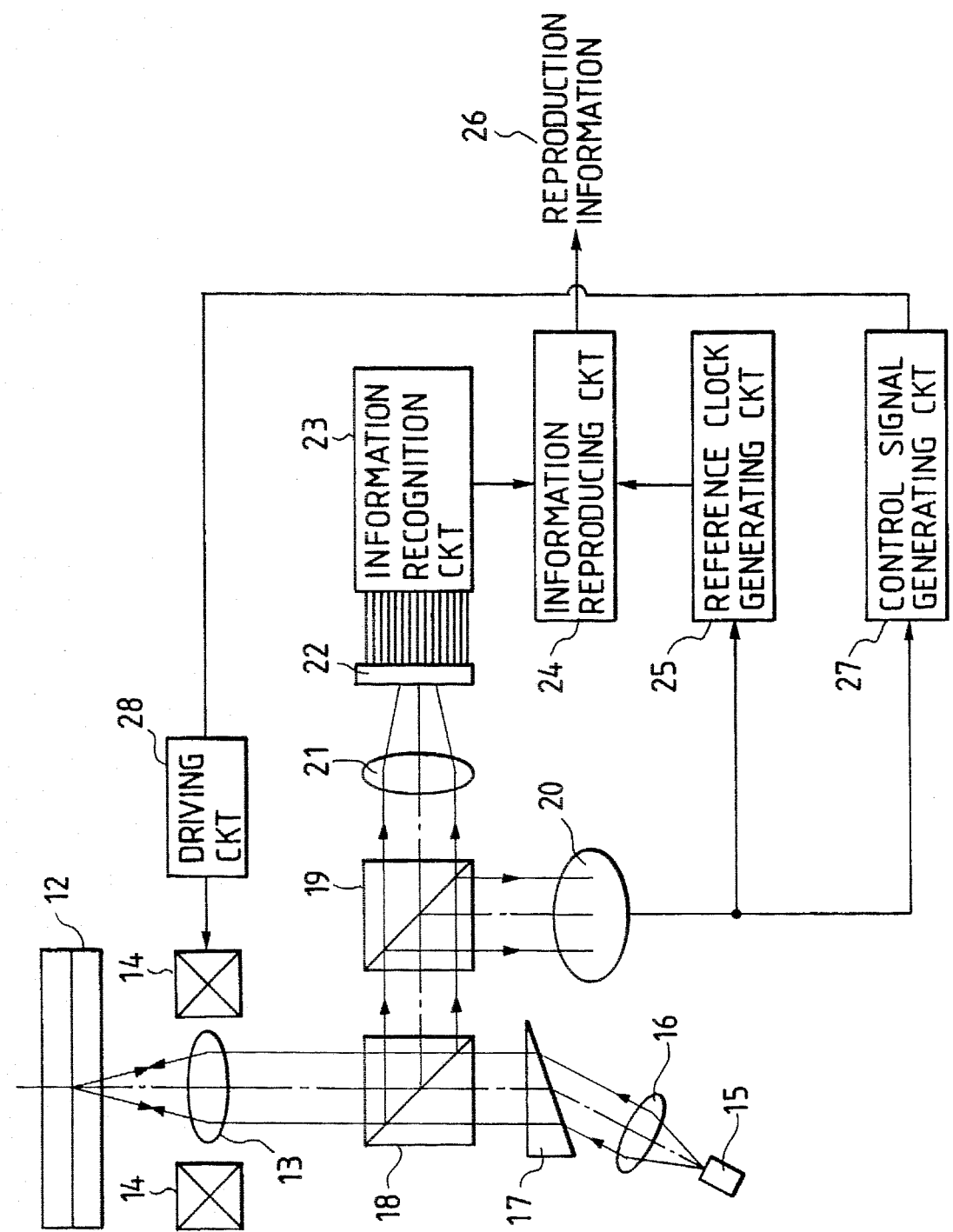
Figure 12:
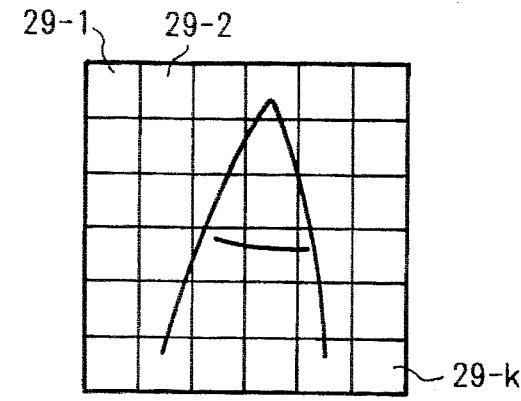
Figure 13:
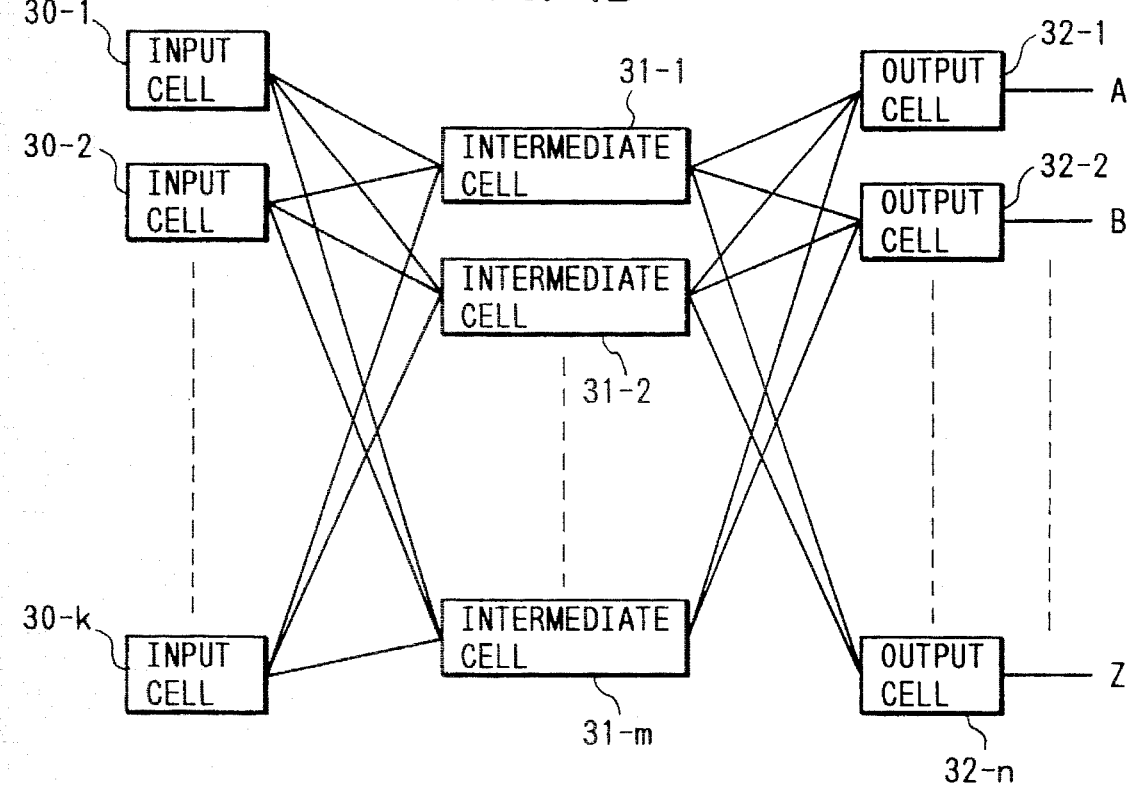
Figure 14:
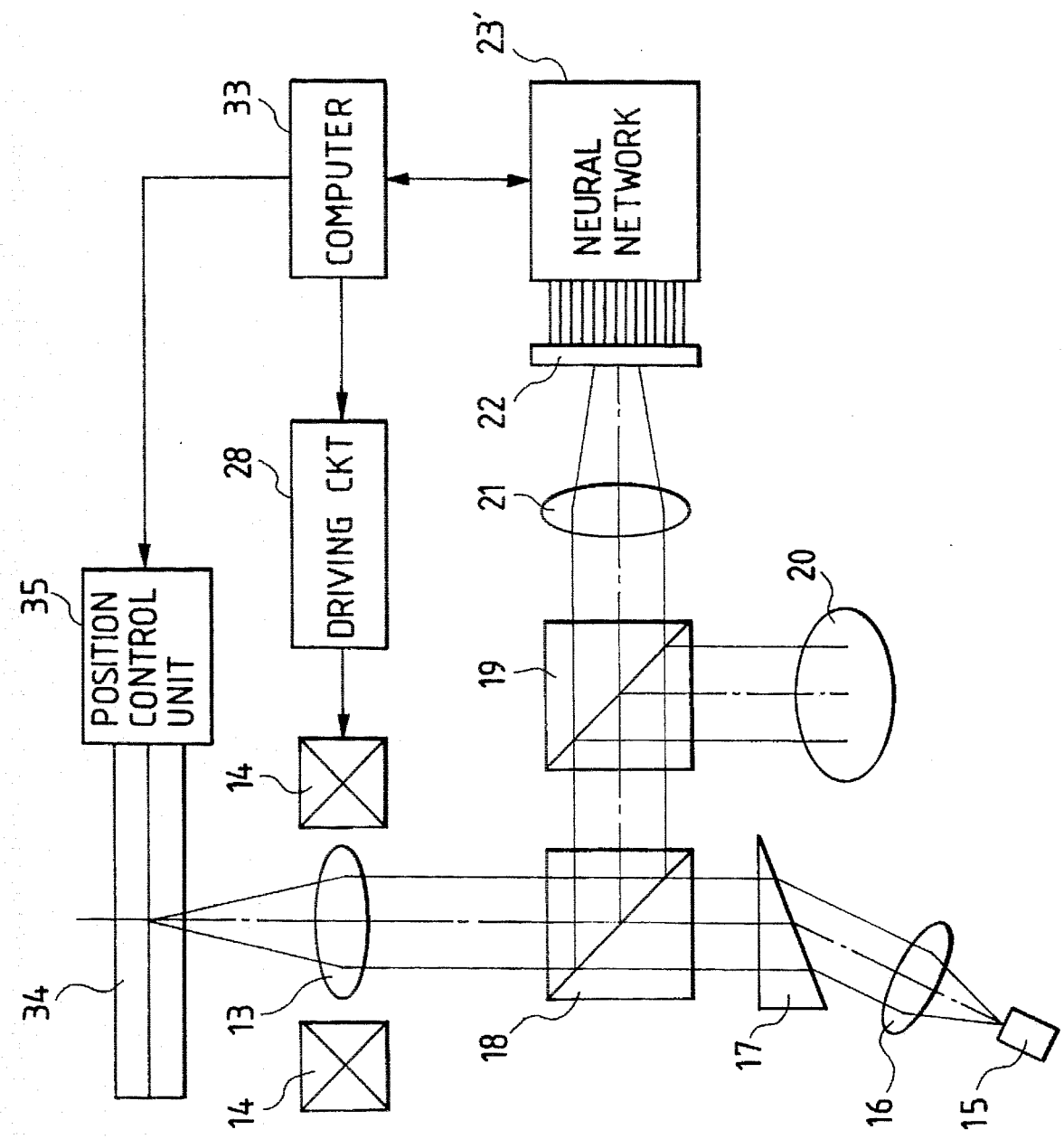
Figure 15:
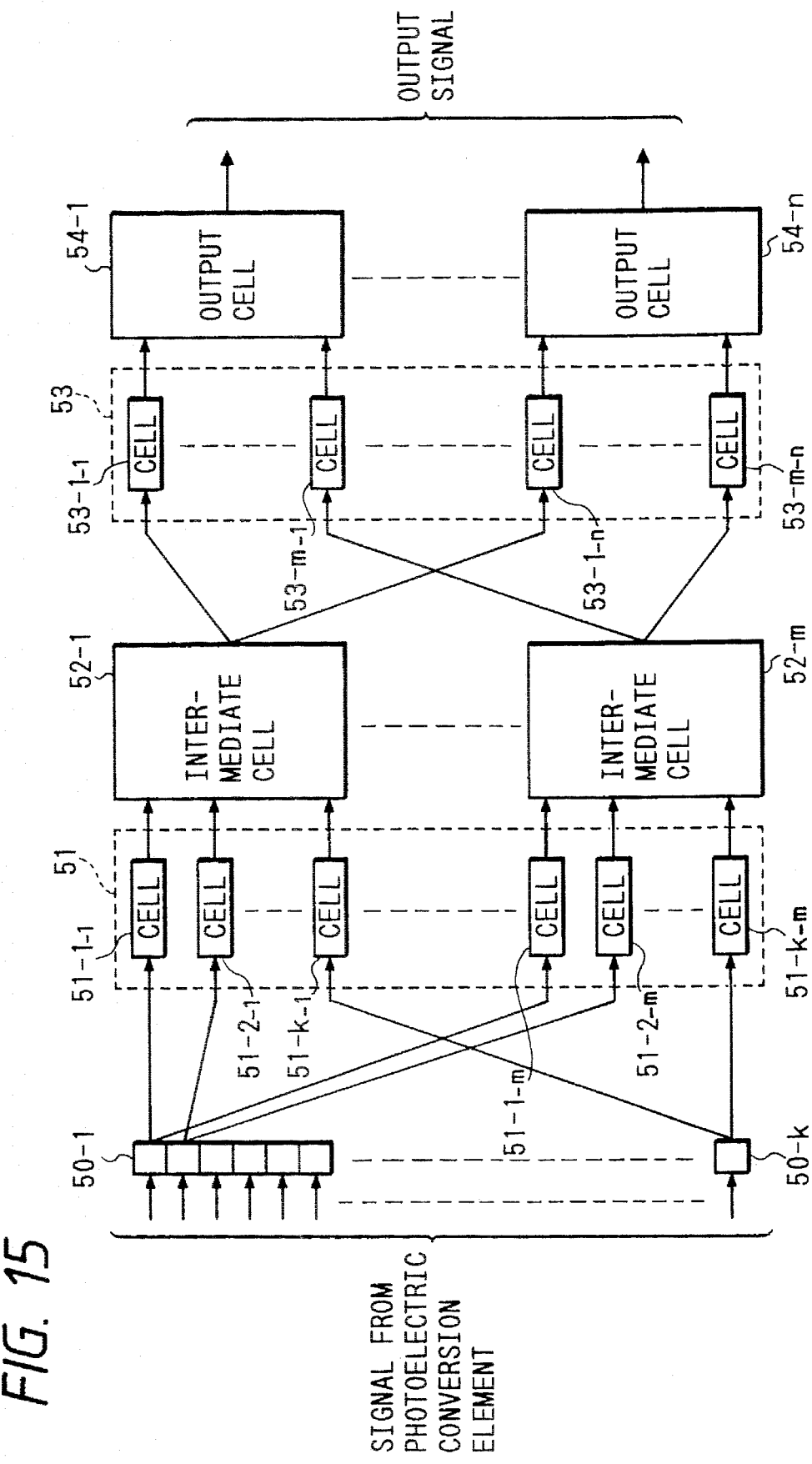
Figure 16:
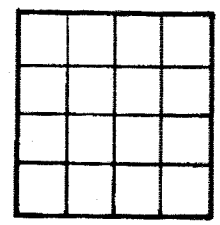
Figure 17:
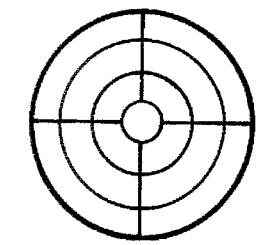
Figure 18:
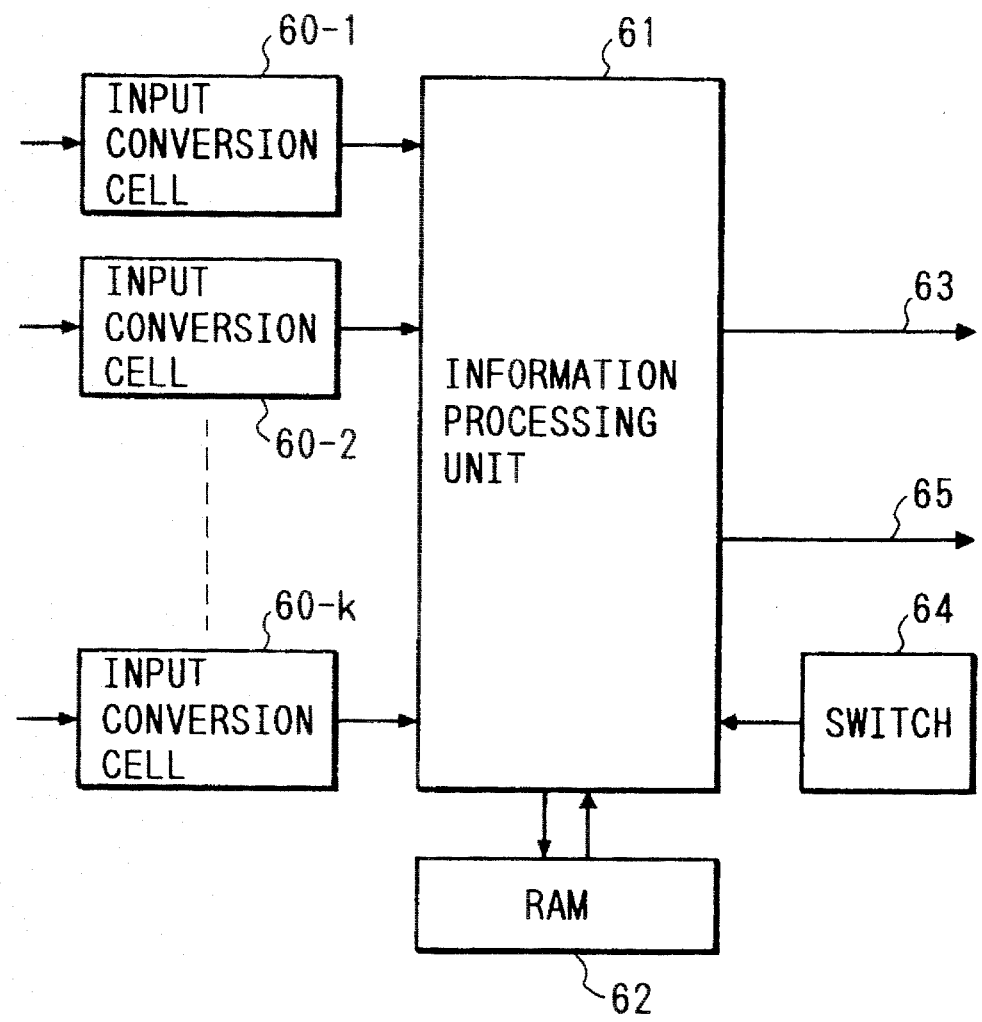
Figure 19:
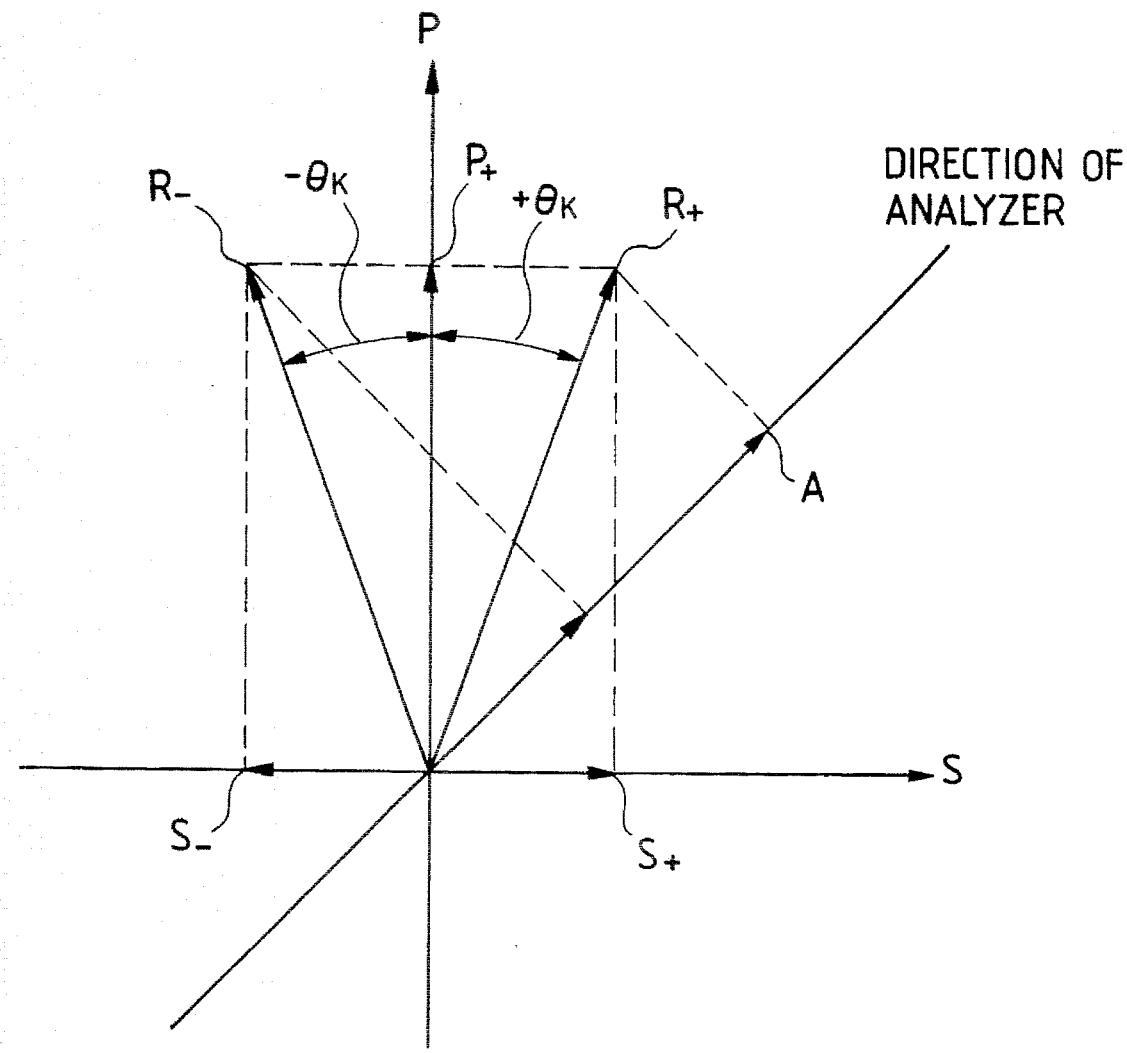

FIGS. $8(a)_1$ through $8(e)_2$, $9(a)_1$ through $9(e)_2$ and $10(a)_1$ through $10(e)_2$ are schematic views showing examples of the information pits of different kinds employed in the present invention and the light amount distributions on the photodetector when said pits are irradiated by the light spot;

FIG. 11 is a schematic view of an embodiment of the information reproducing apparatus of the present invention;

FIGS. 12 and 13 are schematic views showing the principle of a back propagation neural circuit network;

FIG. 14 is a schematic view of an apparatus for learning of a neural circuit network;

FIG. 15 is a schematic view of a neural circuit network based on back propagation;

FIGS. 16 and 17 are schematic views showing examples of a light-receiving face of the photodetector employed in the present invention;

FIG. 18 is a schematic view showing another example of the information recognition circuit employed in the present invention;

FIG. 19 is a schematic view showing the principle of detection of a magnetooptical signal; and FIG. 20 is a chart showing the principle of magnetic field modulation magnetooptical recording.

DESCRIPTION OF THE PREFERRED EMBODIMENTS

Figure 1:
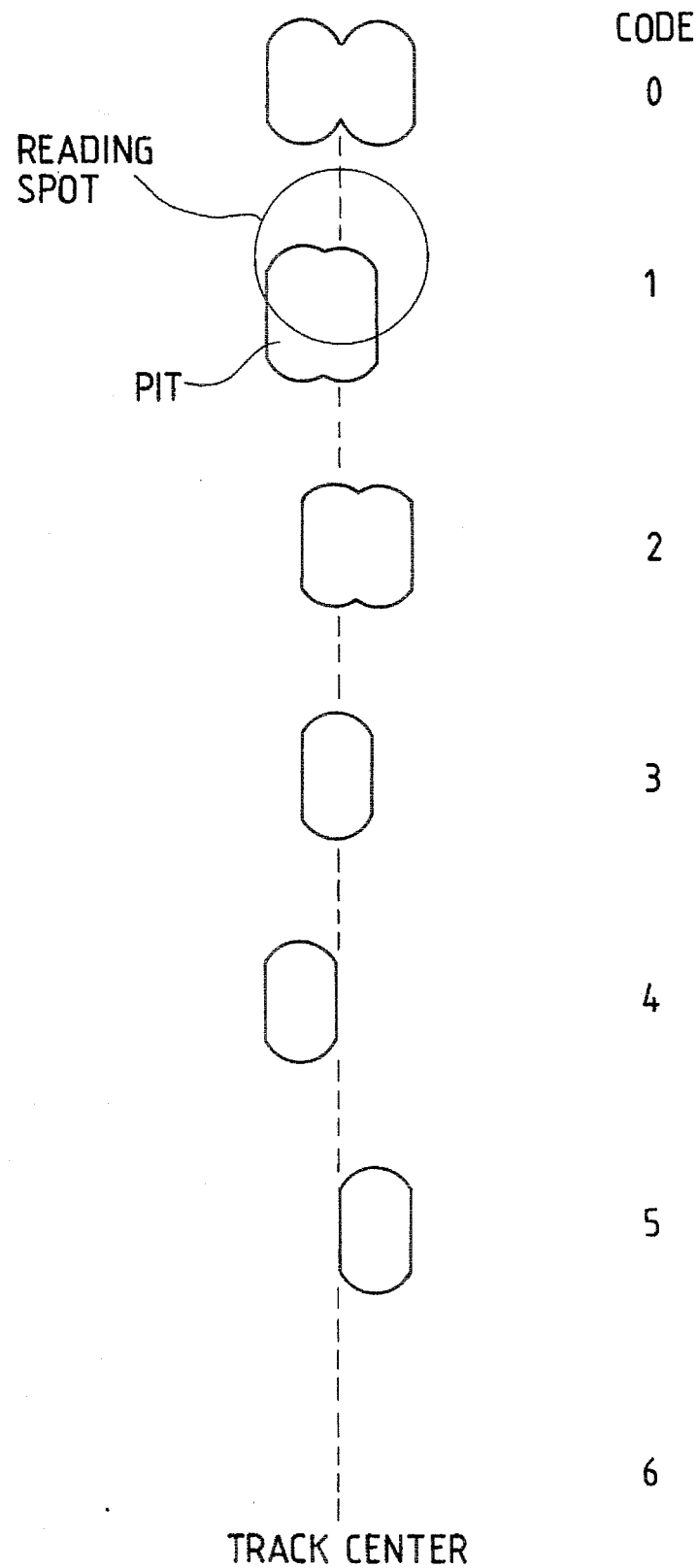
FIG. 1 is a schematic view showing a conventional method for recording information represented by the arrangement of codes of three or more kinds.
Figure 2:
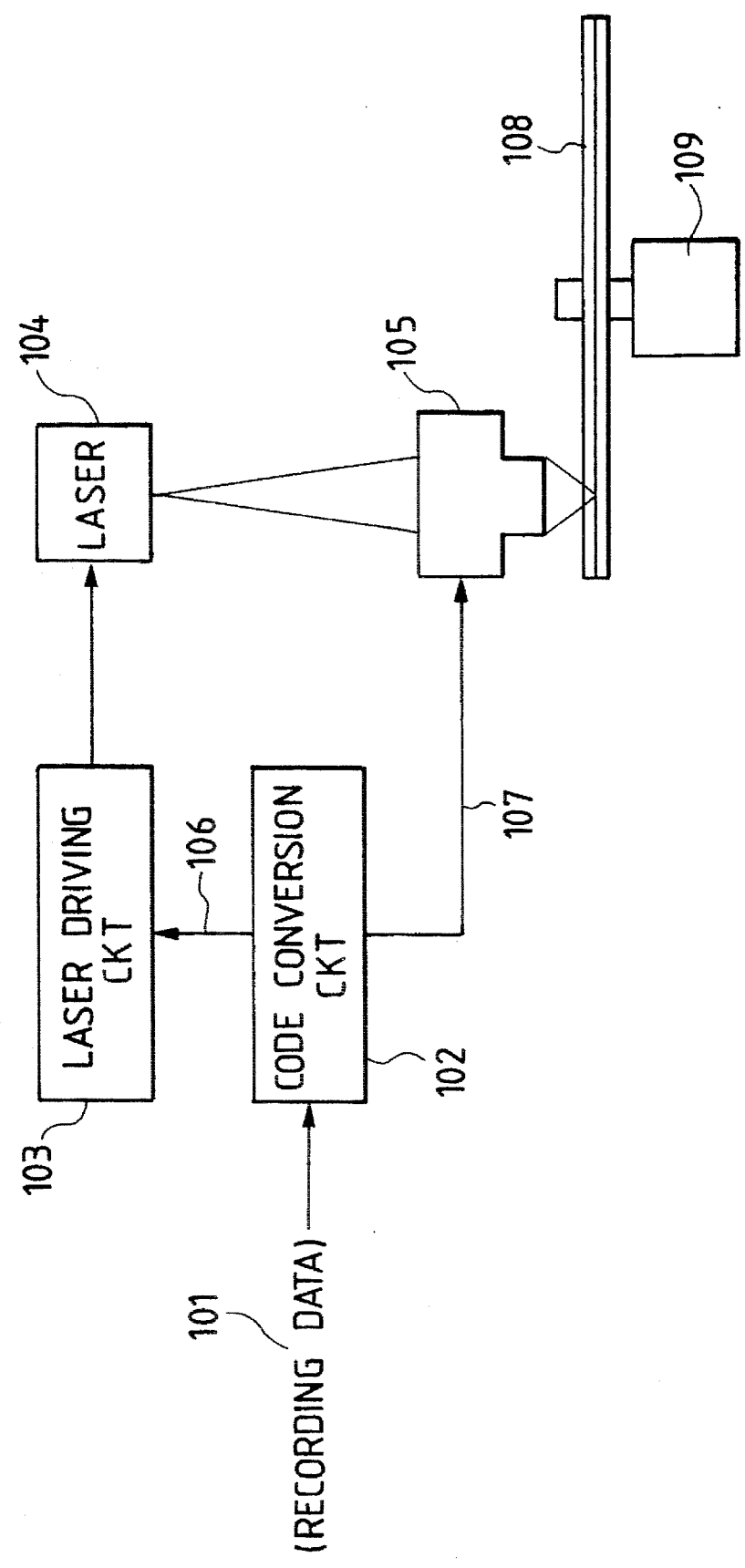
FIG. 2 is a schematic view showing the configuration of an information recording apparatus employed in the method shown in FIG. 1.
Figure 3:
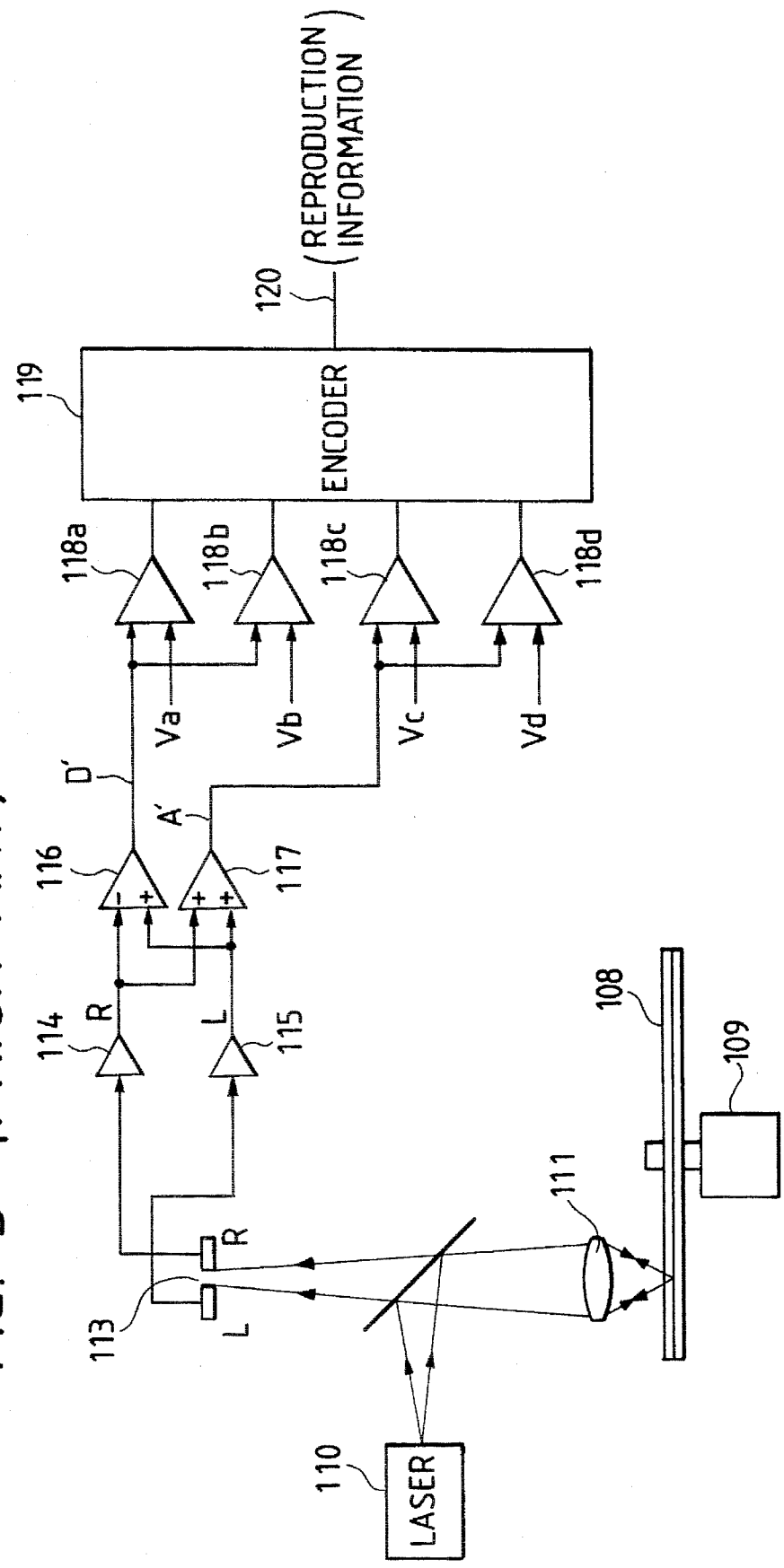
FIG. 3 is a schematic view showing the configuration of an information reproducing apparatus for reproducing the information recorded by the method shown in FIG. 1.
Figure 5:
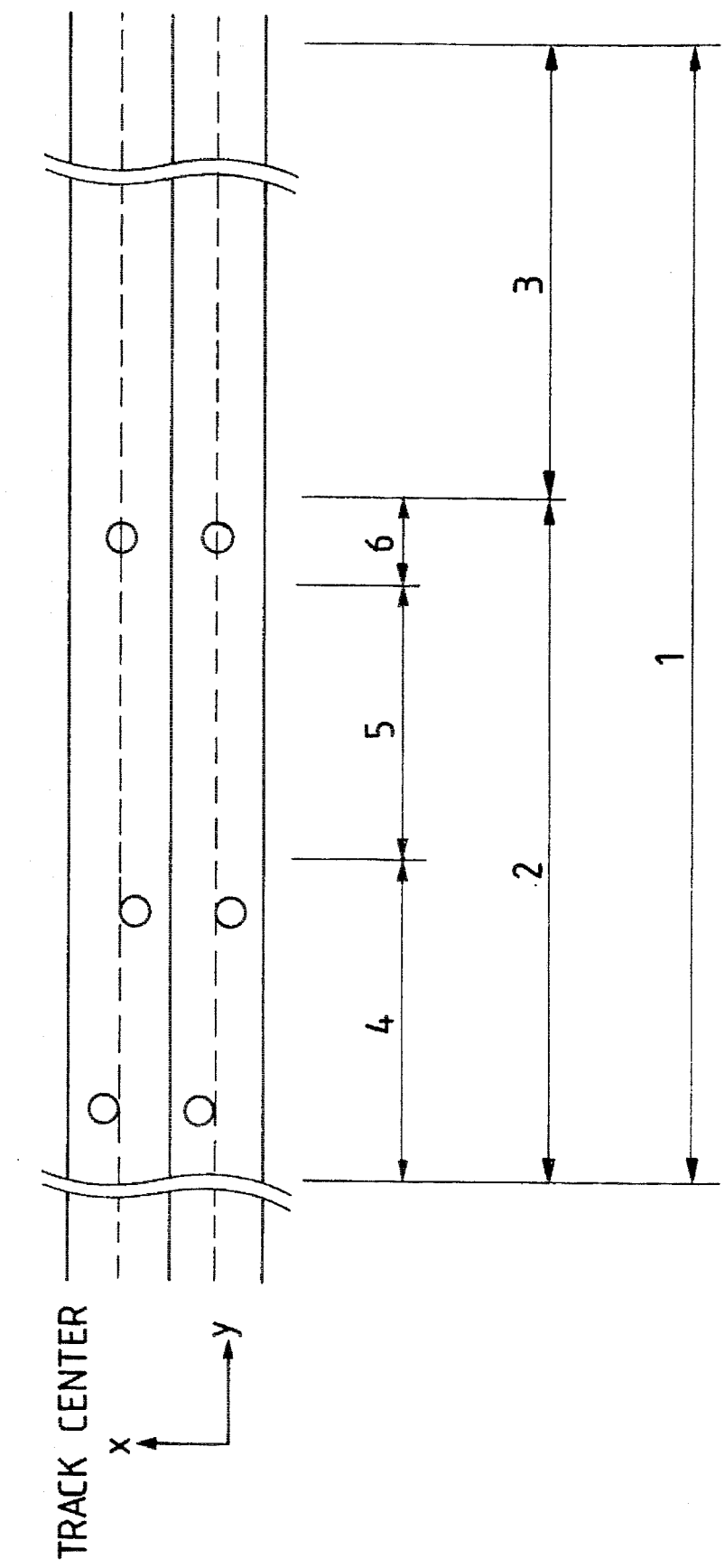
FIG. 5 is a schematic view showing a format of the information recording medium employed in the present invention.

Now the present invention will be explained in detail by preferred embodiments thereof shown in the attached drawings. At first there will be explained an embodiment of the information recording method of the present invention. FIG. 5 shows an example of the format of the optical information recording medium, and there is illustrated a part of a circular track on a disk-shaped recording medium. A block 1 indicates a unit recording area equivalent to a sector, and is divided into a control area 2 and an information area 3. In the control area 2 there are provided a tracking pit area 4 containing wobbling pits, a focusing area 5 consisting of a mirror surface, and a clocking pit area 6 for obtaining the timing for data reproduction. The information area 3 can be freely used for information recording and reproduction. The tracking pit and clocking pit are formed as recesses or projections, with a depth or a height preferably of $\lambda/8n$, wherein $\lambda$ is the wavelength of the reproducing light, and n is the refractive index of the substrate. A circular track generally contains 1,000 to 1,400 blocks 1.

FIG. 6 shows an embodiment of the information recording method of the present invention, and illustrates a train of information pits recorded in the information area 3. In FIG. 6, 8a–8e are reference positions on the recording medium, based on the timing of reference clock signals generated by the detection of the clocking pit, and the information is sampled and reproduced according to said timing. Reference numerals 9a–9e indicate reproducing light spots at the reproducing positions corresponding to the timings 8a–8e. Information pits 10a–10e, recorded on the information track 7, record multi-value information by the combination of the length of the pit in the longitudinal direction of a track and the distance between a reference position determined on the recording medium according to the reference clock signal and the center of the pit on said medium, as will be explained later. The distance between the reference position and the pit center corresponding to the relative position between the pit and the reproducing light spot at the signal reading timing are synchronized with the reference clock signal.

The information pit can be formed as a recess or a projection as explained before, but the depth or height thereof is preferably $\lambda/4n$. Also, the maximum length of the information pit in the longitudinal direction of a track is preferably equal to or less than the diameter of the reproducing light spot, in consideration of the crosstalk with the adjacent pit in the high density recording.

Referring to FIG. 6, the length of an information pit 10a in the longitudinal direction of the track is about a half of the diameter of the reproducing light spot 9a, and the pit center is shifted by a predetermined amount to the +Y direction, with respect to the reference position 8a, or the reproducing light spot 9a at the timing of signal reading. The Y-direction is taken in the longitudinal direction of the track, and the X-direction is taken in the perpendicular direction thereto. The length of each of the information pits 10b–10d is about ⅓ of the diameter of the reproducing light spot, but the center of the information pit 10b is shifted by a predetermined distance in the −Y direction from the reference position 8b (center of the reproducing light spot 9b), while that of the pit 10c is positioned at the reference position 8c (center of the reproducing light spot 9c), and that of the pit 10d is shifted by a predetermined distance in the +Y direction from the reference position 8d (center of the reproducing light spot 9d). Also, the length of an information pit 10e in the longitudinal direction of the track is about ⅗ of the diameter of the reproducing light spot 9e, but the center of said pit is shifted by a predetermined distance in the −Y direction from the reference position 8e (center of the reproducing light spot 9e). In the present invention, as explained above, multiple values are given to the information pits by the length thereof in the longitudinal direction of the track and the relative position thereof to the reference position corresponding to the reference clock signal, but the combination of such variable factors is not limited to that shown in FIG. 6. In the example shown in FIG. 6, the length of an information pit in the longitudinal direction of the track is varied in three levels and the relative position of the information pit to the reference position is also varied in three levels, but the number of multiple values can naturally be increased by employing a larger number of combinations. In FIG. 6, 11a to 11c are three-dimensional representations of the light amount distribution when the information pit is irradiated with the reproducing light spot and the light reflected from the pit is focused on the photodetector, and respectively correspond to the information pits 10b, 10c and 10d. The y' direction corresponds to a direction on the photodetector corresponding to the longitudinal direction of the track, and the x' direction indicates a perpendicular direction thereto.

Figure 7D:
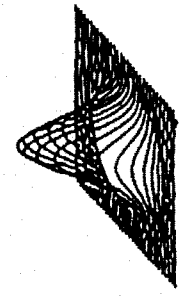
FIGS. 7(a) through 7(e) are schematic views showing the light amount distribution when the light spot irradiates a part of the recording medium free from recording pits.
Figure 7C:
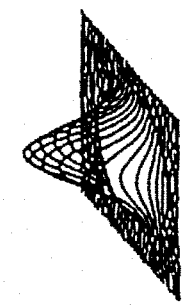
Figure 7B:
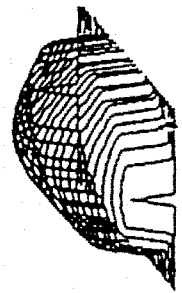
Figure 7A:
Figure 7E:
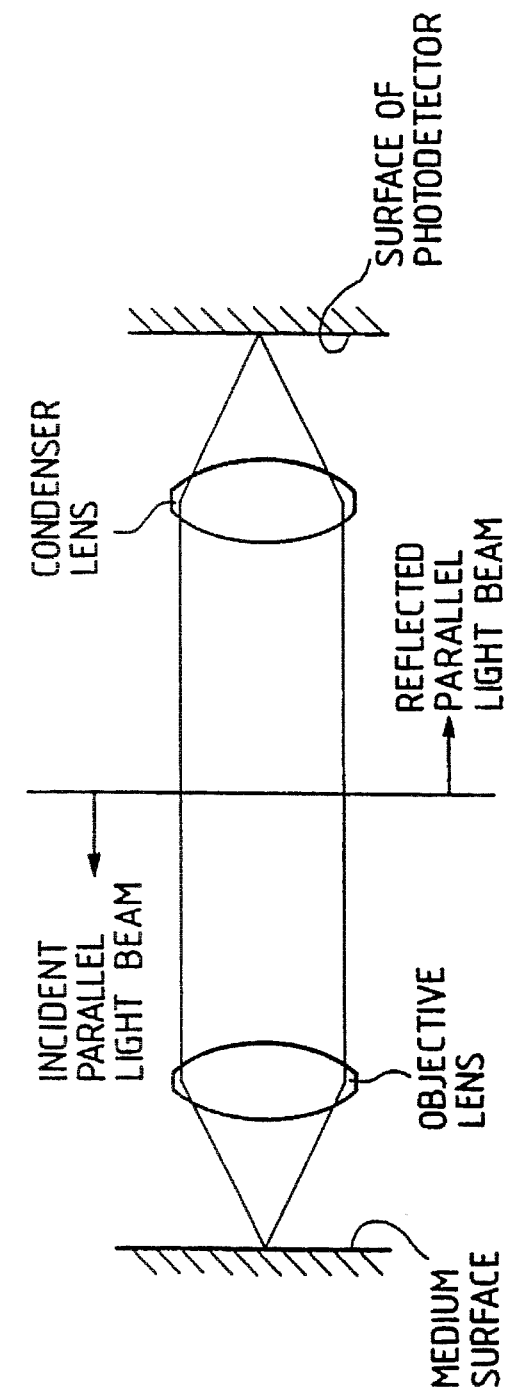

In the following there will be given an explanation on the light amount distribution on the photodetector, when the information pit is irradiated by the reproducing light spot. FIG. 7(e) shows the light amount distribution in the absence of the information pit. In the information reproduction, an unrepresented semiconductor laser emits a recording light beam, which is converted, through an unrepresented beam shaping prism and an unrepresented collimating lens, into a parallel light beam with a Gaussian intensity distribution, as indicated by FIG. 7(a). FIGS. 7(a) through 7(e), the diameter of said beam is about 6 mm, while the aperture size of the optical head is about 4 min. The light amount distributions shown in these figures do not correspond to the total light amount but are normalized to the maximum value. The incident parallel beam is condensed by an objective lens and focused as a light spot of 1–2 μm on the surface of the recording medium, with a light amount distribution indicated by FIG. 7(b). The incident beam is reflected by the medium surface, transmitted again by the objective lens and converted into a reflected parallel beam, of which light amount distribution FIG. 7(c) is the same as that of the incident light beam because of the absence of the information pit on the medium surface. The medium surface naturally constitutes a uniform reflecting surface. The parallel beam reflected from the medium surface is condensed by a condenser lens and focused on a photodetector. The light amount distribution FIG. 7(d) thereon is similar to that on the medium surface, again because of the absence of the information pit.

In the following there will be explained the light amount distribution on the photodetector when an information pit is recorded on the medium surface. FIGS. 8(a)₁ through 8(e)₂ show the light amount distributions when an information pit, with a length in the longitudinal direction of a track of about ⅓ of the diameter of the reproducing light spot, is shifted stepwise in the −Y direction with respect to the reference position, or the reproducing light spot at the timing of signal reading. The depth or height of the information pit is λ/4n as explained above, and, under this condition, the reflected lights from the information pit and from the surrounding area are mutually different by π in phase. In FIG. $8(a)_2$ indicates the light amount distribution on the photodetector when the information pit 10 (FIG. $8(a)_1$) is positioned at the center of the reproducing light spot 9, and the relative value of the total light amount on the photodetector in this state is 3.9. Also FIGS. $8(b)_1$ through $8(e)_2$ indicate the light amount distributions when the information pit 10 is stepwise shifted in the −Y direction with respect to the reproducing light spot 9. The light amount distribution varies with the change in the shift amount of the information pit 10, and the relative value of total light amount gradually increases as 6.58, 14.2, 25.8 and 39.6 with the increase in the shift amount. When the information pit 10 is shifted in the +Y direction, the light amount distribution becomes symmetrical with respect to the X' axis as in 11a and 11c shown in FIG. 6, and the total light amount is the same for a same shift amount. Also, FIGS. $9(a)_1$ through $10(e)_2$ show the light amount distribution and the total light amount on the photodetector when the information pit is stepwise shifted in the −Y direction with respect to the reference position on the recording medium, or the reproducing light spot at the timing of signal reading, wherein the length of the information pit is respectively about ½ and ⅗ of the diameter of the reproducing light spot. As will be apparent from these figures, when the information pit is shifted with respect to the reproducing light spot, the light amount distribution and the total light amount vary according to the shift amount, in a similar manner as explained in the foregoing.

As explained in the foregoing in relation to FIGS. 7(a) through $10(e)_2$, the light amount distribution and the total light amount on the photodetector vary, depending on the length of the information pit in the longitudinal direction of the track and its relative position with respect to the reproducing light spot at the timing of signal reading. It is therefore possible, by detecting said light amount distribution and total light amount, to reproduce the length of the information pit and the shift amount thereof in the track direction with respect to the reproducing light spot, or the multi-value information recorded by the combination of these values. In recording multi-value information, the length of the information pit may be varied, for example as shown in FIGS. $8(a)_1$ through $9(e)_2$, in three levels of about ⅓, ½ and ⅗ of the diameter of the reproducing light spot, while the relative position of the information pit with respect to the light spot may be varied, for example, in five levels, namely at the center of the light spot as shown in FIG. $8(a)_2$, also at two positions shifted in the −Y direction as shown in FIG. $8(a)_2$ and $8(b)_2$, and at two other positions shifted oppositely in the +Y direction. These five levels, when combined with three levels in pit length, provide 15 combinations, and, with the addition of a state without an information pit, a 16-value recording can be achieved. Consequently, information of 4 bits can be recorded in an information pit. Naturally this is only an example, and the number of values can be further increased if a sufficient resolving power is provided. Also, the number of values can be further increased by combining the variation in the width of information pit in the transverse direction of the track as explained in the description of the prior art, with the above-explained combinations.

FIG. 11 is a block diagram of an optical information reproducing apparatus for reproducing the information recorded by the above-explained information recording method, wherein shown are an optical information recording medium 12 such as an optical disk or an optical card; an objective lens 13 positioned close to said recording medium 12 and rendered movable in the tracking and focusing directions by an actuator 14; a light source 15 consisting of a semiconductor laser; a collimating lens 16; and a beam shaping prism 17. A laser beam emitted by the semiconductor laser 15 is converted by the collimating lens 16 into a parallel beam, then converted by the beam shaping prism 17 from an elliptical beam into a circular beam, then transmitted through a polarizing beam splitter 18 and focused by the objective lens 13 into a small light spot irradiating an information track of the recording medium 12. The beam reflected therefrom is directed again to the objective lens 13, then guided to the polarizing beam splitter 18, separated from the incident beam from the semiconductor laser 15 and guided to a beam splitter 19. Said beam is further split therein, and a beam 20 is guided to an unrepresented photodetector, which detects the signal of the control area 2 shown in FIG. 5 in the known manner and sends the detected signal to a reference clock generation circuit 25 and a control signal generation circuit 27.

The other beam is condensed by a condenser lens 21 and focused onto the light-receiving surface of a multi-divided photodetector 22. Signals from the elements of said divided photodetector 22 are supplied to an information recognition circuit 23, which stores data on the light amount distribution (total light amount and distribution thereof) corresponding to the length of the information pit in the longitudinal direction of the track and the shift amount of the pit center with respect to the reproducing light spot explained above. The circuit 23 determines the correlation of the actual total light amount and its distribution obtained in the divided photodetector 22 with the stored data, thereby recognizing the length and the shift amount of the information pit, then converts these data into the corresponding information, and sends said information in successive manner to an information reproducing circuit 24. The above-mentioned recognition of information may be conducted by hardware or by software. The reference clock generation circuit 25 generates a reference clock signal, by detecting the clocking pits explained in FIG. 5 and sends said clock signal to the information reproducing circuit 24, which samples the information from the information recognition circuit 23 at the timing of said reference clock signal, thereby generating reproduced information 26. The control signal generation circuit 27 generates a tracking error signal by detecting the tracking pits, and a focusing error signal in the mirror surface area in the focusing area. These servo control signals are supplied to the driving circuit 28, which in response drives the actuator 14, thereby effecting the focusing control for focusing the laser beam onto the medium surface and the tracking control for scanning the desired track with the light spot.

In the following there will be explained an example of the information recognition circuit 23. In the present embodiment, a neural network simulating the human information processing mechanism is utilized, as the information recognition circuit 23. As an example of the neural network there is already known one based on back propagation, of which principle will be explained with reference to FIGS. 12 and 13, showing a case of recognizing a handwritten letter by a neural network. FIG. 12 shows an input unit divided into k areas 29-1–29-k. In FIG. 13, there are shown cells 30-1–30-k which are called an input layer and which respectively receive signals detected in the elements of the input unit. Said cells provide cells 31-1–31-m, called an intermediate layer, with certain weighted signals, and said cells of the intermediate layer provide cells 32-1–32-n called an output layer, with similar signals. Each of the cells in the intermediate and output layers is a nonlinear element which releases an output signal when the input signal exceeds a certain fixed value. Also, the weights among different cells are determined by an operation called learning. In this operation, the weights are varied according to a mathematical rule, based on the error in the output in response to the input. By repeating this operation, the values of weights so converge as to provide a correct output. Thus, after the completion of the learning operation, there is obtained a recognition circuit for the handwritten letter, in the form of weights of the cells.

The weights of the cells in the neural network of the above-explained principle are determined through a learning process. In the present embodiment, the learning operation is conducted at the manufacture or adjustment of the optical head, by an apparatus shown in FIG. 14. In FIG. 14, there are shown a computer 33 for the learning operation, a recording medium 34 for reference, and a position control unit 35 for controlling the position of said recording medium 34. The computer 33 can arbitrarily vary the positions of the light spot and the reference recording medium 34, by controlling the driving circuit 28 for the actuator 14 and the position control unit 35. In predetermined positions on the reference recording medium 34, there are recording reference pits of at least three kinds, mutually different in the pit length and in the shift amount as explained before. The actuator 14 is fixed, under the control by the computer 33, so as to form a light spot in a predetermined position. It is assumed that 16 information pits shown in Table 1, respectively corresponding to the codes of multi-value information as shown therein, are recorded on the reference recording medium 34.

TABLE 1

| Reference pit | Code |
| --- | --- |
| Information pit shown in FIG. 8(c) | 0 |
| Information pit shown in FIG. 8(b) | 1 |
| Information pit shown in FIG. 8(a) | 2 |
| Pit shifted by the same amount as but inversely to the pit shown in FIG. 8(b) | 3 |
| Pit shifted by the same amount as but inversely to the pit shown in FIG. 8(c) | 4 |
| Information pit shown in FIG. 9(c) | 5 |
| Information pit shown in FIG. 9(b) | 6 |
| Information pit shown in FIG. 9(a) | 7 |
| Pit shifted by the same amount as but inversely to the pit shown in FIG. 9 (b) | 8 |
| Pit shifted by the same amount as but inversely to the pit shown in FIG. 9(c) | 9 |
| Information pit shown in FIG. 10(c) | 10 |
| Information pit shown in FIG. 10(b) | 11 |

TABLE 1-continued

| Reference pit | Code |
| --- | --- |
| Information pit shown in FIG. 10(a) | 12 |
| Pit shifted by the same amount as but inversely to the pit shown in FIG. 10(b) | 13 |
| Pit shifted by the same amount as but inversely to the pit shown in FIG. 10(c) | 14 |
| No information pit | 15 |

The reference recording medium 34 bearing the above-mentioned reference pits is irradiated by the reproducing light beam from the semiconductor laser 15, and control is made in such a manner that the information track, bearing said reference pits, is scanned by the reproducing light spot. The reflected light from the information track is read by the multi-divided photodetector 22, and the obtained signals are supplied to the neural network 23'. The computer 33 reads the state of the output layer of the neural network 23' and calculates the error from the correct state (teacher signal) of the output layer. Then, according to said error, the computer 33 varies in succession the weights of the cells in the neural network 23', according to a predetermined mathematical process. The teacher signals in this case are the codes for the different pits. More specifically, a memory in the computer 33 stores the pit positions on the reference recording medium 34 and the corresponding codes, and the computer 33 determines the weights based on said stored data.

The learning is achieved by varying the weights until the pits are correctly recognized, for example at first by varying the weights until a reference pit is correctly recognized and then by varying weights until a next reference pit is correctly recognized. Another method consists of varying the weights by one round for a pit, then repeating such variation of weights in succession for other pits, and further repeating said variation of weights until correct recognitions are obtained in the respective pits. The initial weights may be given by random numbers or by the values determined by another method in advance. Otherwise there may be employed the learned values of another reference optical head, or, if the optical head has sufficient accuracy, there may be employed values in another neural network which already completed the learning process. Through the above-explained process the weights are recorded in a memory of the neural network 23', and the learning process is completed. Thereafter the computer 33 etc. become unnecessary and may be detached from the apparatus.

FIG. 15 is a circuit diagram of a neural network 23' based on the conventional back propagation method. Cells 50-1–50-k of the input layer respectively receive electrical signals obtained by photoelectric conversion in the k elements of the multi-divided photodetector 22. The divided photodetector 22 is divided in square or circular elements as shown in FIGS. 16 and 17, and the signals respectively from the thus divided elements are given to the cells of the input layer. The structure of the divided photodetector 22 is not limited to the examples shown in FIGS. 16 and 17 but are subject to various modifications. Weight cells 51 are provided in k units for each of m intermediate cells 52-1–52-m. The output for example of the input cell 50-1 is divided into m and given to the weight cells 50-1-1–50-1-m. Similarly the output of each of the input cells 50-2–50-k is divided into m and given to the corresponding weight cells. Each weight cell consists of an amplifying element, of which gain is individually determined by the computer 33 as explained before. For example, the gains are stored in digital data in a random access memory (not shown) and are given to the respective cells after digital/analog conversion.

Also, the gain of each weight cell may be varied by providing the cell with an electronic switch (not shown), and varying the resistance by means of said switch. In this case the computer 33 controls the gain by shifting said electronic switch. The signals weighted by the weight cells are supplied to the intermediate cells. For example, the signals from the weight cells 51-1-1–51-k-1 are supplied to an intermediate cell 52-1. Each intermediate cell consists of a non-linear element, which adds the positive input signals and subtracts the negative input signals, and releases an output signal when the obtained sum exceeds a certain threshold value. Weight cells 53, similar to the weight cells 51, are provided in n units for each of n output cells 54-1–54-n. The output for example of the intermediate cell 52-1 is divided into n and given to the corresponding weight cells. Similarly the output from each of the other intermediate cells is divided into n and given to the corresponding weight cells. Each of the weight cells 53 consists of an amplifying element similar to the weight cell 51, with an amplification factor determined by the computer 33 as explained above.

Signals weighted in the weight cells 53 are supplied to the output cells 54-1–54-n. For example, the signals from the weight cells 53-1-1–53-m-1 are supplied to the output cell 54-1. As in the intermediate cells, each output cell adds the positive input signals, subtracts the negative input signals, and releases an output signal when the obtained sum exceeds a certain 10 threshold value. The output signals of said output cells respectively correspond to the predetermined codes (in this case 0–15; n=16). For example, the output cell 54-1 is assumed to be designed for recognizing a pit shown in FIG. 8($c$)$_2$. In such a case, in response to an input corresponding to FIG. 8($c$)$_2$, the output cell 54-1 releases an output signal, while the correct output of the neural network should be the code 0. The computer 33 reads the output state of the output cells, then calculates the difference from the teacher signals, and accordingly determines the amplification factors of the weight cells 51, 53.

FIG. 18 is a block diagram showing another embodiment of the neural network, formed by the software of a microcomputer, in contrast to the neural network formed by hardware in FIG. 15. In FIG. 18, input conversion cells 60-1–60-k respectively receive electrical signal obtained by photoelectric conversion in the k elements of the divided photodetector 22. The input conversion cells effect analog/digital conversion, and the obtained data are fetched by the information processing unit 61, which effects the process, explained in relation to FIG. 15, by software, based on the conventional back propagation method. The weights of the cells are stored in a random access memory 62. The output 63 of the information processing unit 61, representing the codes recognized for the respective pits, is supplied to the information reproducing circuit 24 shown in FIG. 11. Said information processing unit 61 at least has a learning mode and an information processing mode, which are selected by a switch 64.

At the manufacture or adjustment of the optical head, there is selected the learning mode, in which the teacher signals are stored in an internal memory of the information processing unit 61. In this case the learning computer 33 shown in FIG. 14 is not employed, and a signal 65 from the information processing unit 61 controls the driving circuit 28 for the actuator 14 and the position control unit 35 for controlling the position of the reference recording medium 34, thereby placing the reference pit, having a predetermined pit length and shift amount, within the reproducing light spot. Then the input signals are fetched by changing the reference pits in succession. Subsequently the operation explained in relation to FIG. 15 is executed by software, and the obtained results are compared with the teacher signals. Then, according to the error from the teacher signals, the weights of the cells are varied and the content of the RAM 62 is renewed. After the learning process, the switch 64 is shifted to the information process mode. The content of the RAM 62 is retained, and the codes recognized from the input signal, based on the thus stored weights, are transferred to the information reproducing circuit 24.

In the present embodiment, as explained in the foregoing, the light amount distribution ( total light amount and its distribution) detected by the multi-divided photodetector 22 is recognized in succession by the neural network 23', and the correct information is reproduced by sampling the train of the thus recognized information at the timing of the reference clock signals. It is therefore rendered possible to execute the learning process including the fluctuation in the characteristics of the optical components and the alignment errors thereof, so that the information reproduction can be achieved without being influenced by the conditions of the components.

In the foregoing description, it has been assumed that the information pits are phase shifting recesses or projections formed on an optical information recording medium, but the present invention is likewise applicable to a magnetooptical recording medium in which the information is recorded by upward and downward magnetizations and the reproduction is conducted optically by Kerr effect or Faraday effect. The recording method in the case of such magnetooptical medium can be the format of sampling servo shown in FIG. 5 or a format with a continuous groove. The record pit (domain) obtained by the magnetooptical head is circular (or oval) or arrow feather shaped. Those close to the information pits shown in FIG. 6 are arrow feather shaped domains obtained by the magnetic field modulation overwriting, which will be explained later. Though the optical head for the magnetooptical medium is similar to the optical head shown in FIG. 11, there will be required, in the case of magnetic field modulation overwriting, a magnetic head for generating an external recording magnetic field, in a position opposed to the objective lens 13, across the optical recording medium (which in this case is a magnetooptical recording medium). Also, the beam splitters 18, 19 shown in FIG. 11 are preferably polarizing beam splitters of which reflectance and transmittance vary depending on the polarizing components. Also, an analyzer is required between the beam splitter 19 and the condenser lens 21.

When the magnetooptical recording medium, which records information by the difference in the direction of magnetization, is given a linearly polarized light, the polarizing direction of said light rotates clockwise or counterclockwise, according to the direction of magnetization. It is now assumed, as shown in FIG. 19, that the linearly polarized incident light to the optical recording medium 12 is polarized in the direction of axis P, while a reflected light corresponding to the downward magnetization has a poralizing direction $R_+$ rotated by an angle $+\theta_k$ and another reflected light corresponding to the upward magnetization has a polarizing direction $R_-$ rotated by an angle $-\theta_k$. If the aforementioned analyzer is placed in a direction shown in FIG. 19, there are obtained transmitted lights A, B respectively corresponding to $R_+$, $R_-$. Conventionally information is obtained as the difference in light intensity, by detecting said lights A and B by a photodetector. In the present embodiment, components $S_+$ and $S_-$ in the direction S are utilized. When the direction of the analyzer is placed in the direction S, the lights $S_+$ and $S_-$ alone are transmitted thereby. Though these lights are both S-polarized components, they are different in phase by $\pi$. Stated differently, the S-polarized components in the reflected light from the magnetooptical information pits (domains) behave similarly to those shown in FIGS. $8(a)_1$ through $10(e)_2$. Therefore, the information can be reproduced in a similar manner as explained before, by detecting said lights with the multi-divided photodetector 22. If the S-polarized components are weak, it is also possible to reproduce the information in a similar manner by placing the direction of the analyzer between the directions P and S as shown in FIG. 19 and by obtaining the distribution of the interference component between the distribution of the S-polarized component as shown in FIGS. $8(a)_1$ through $10(e)_2$ and the Gaussian distribution of the P-polarized light as shown in FIG. $7(d)$.

Now reference is made to FIG. 20 for explaining the magnetic field modulation overwriting, which is a method for recording information pits (domains). In said magnetic field modulation overwriting, the light spot irradiates with a constant power $P_W$, thereby elevating the temperature of a recording layer on the magnetic layer of the magnetooptical recording medium, close to the Curie point. In the thus heated state, an external magnetic field, modulated according to the recording signal, is applied by a magnetic head to the position of the light spot. Thus the direction of magnetization of the recording layer is aligned to that of the modulated magnetic field, and the overwriting can be achieved without erasure of the previously present information. The domain formed in this operation has the shape of an arrow feather, as shown in FIG. 20, with a width w corresponding to the modulation width w' of the magnetic field. Thus the domain width w can be made smaller than the size of the light spot, by reducing the modulation width w' of the magnetic field. Also, the center position of the domain can be shifted with respect to the reproducing light spot, by advancing or delaying the magnetic field modulation with respect to the timing of the reference clock signal. It is thus possible to shift the center of the domain frontward or rearward as in the information pits shown in FIG. 6. In this case it is necessary to consider a fact that the domain edge is advanced slightly from the timing of switching of the modulated magnetic field.

The above-explained method allows recording magnetooptical domains of arrow feather shape, equivalent to the information pits shown in FIG. 6, and the information can be reproduced from such magnetooptical domains, by the recognition of the total light amount and its distribution as explained before. Also, high-speed recording or reproduction of information is possible when the multi-value recording is executed with a magnetooptical recording medium. Also, in the multi-value recording of information employing the width in the perpendicular direction to the track direction, such information can be reproduced by the use of a multi-divided photodetector and a neural network of a corresponding structure.

As explained in the foregoing, the present invention provides, through recording of multi-value information by the combination of the length of the information pit in the longitudinal direction of the track and the shift amount of said information pit in the longitudinal direction of the track with respect to the reference position (or reproducing light spot at the timing of signal reading), advantages of significantly increasing the number of values, thereby significantly increasing the recording capacity of the recording medium. Also, by recognizing the length and the shift amount of the information pit from the total light amount and the distribution thereof obtained from the multi-divided photodetector, the present invention provides advantages of conducting effective reproduction of the information with a large number of values, and achieving high-speed reproduction.

The present invention is not limited to the foregoing embodiments but is subject to various modifications. For example, in the foregoing embodiments, the information is reproduced from the reflected light of the light spot irradiating the recording medium, but it is also possible to detect the light transmitted through the medium with the photodetector. Also, in the foregoing embodiments, the width of the information pits in the perpendicular direction to the track is maintained constant, but the information pits of a larger number of kinds can be obtained, as already explained before, by varying said width. The present invention includes all such modifications as long as they are within the scope and spirit of the appended claims.

What is claimed is:

1. A method of encoding information into at least three kinds of codes, and recording an arrangement of the at least three kinds of codes on a recording medium having tracks, said method comprising steps of:

making the codes of the information to respectively correspond to information pits of at least three kinds; and forming the information pits corresponding to the codes on the recording medium, in an arrangement along the tracks, wherein the information pits of different kinds can be mutually identified by the length along the longitudinal direction of a track, and the distance along the longitudinal direction of a track between the center of a pit on the recording medium and a reference position determined on the medium according to a reference clock signal.

2. A method according to claim 1, further comprising recording the information pits by forming a projection on a substrate of the recording medium.

3. A method according to claim 1, wherein the recording medium comprises a magneto-optical recording medium, and further comprising recording the information pits by forming a magnetic domain on the recording medium.

4. A method according to claim 1, further comprising recording the information pits by forming a recess on a substrate of the recording medium.

5. A method of encoding information into at least three kinds of codes, and recording an arrangement of the at least three kinds of codes on a recording medium having tracks, said method comprising steps of:

setting, on the tracks, reference positions at predetermined intervals corresponding to a reference clock signal; and recording information pits, corresponding to the codes of the information, respectively on the reference positions, wherein the information pits corresponding to different codes are mutually different in at least one of the length along the longitudinal direction of the tracks and in the amount of shift from the reference position to the center position of the pits in the longitudinal direction of the tracks.

6. A method according to claim 5, further comprising recording the information pits by forming a projection on a substrate of the recording medium.

7. A method according to claim 5, wherein the recording medium comprises a magneto-optical recording medium, and further comprising recording the information pits by forming a magnetic domain on the recording medium.

8. A method according to claim 5, further comprising recording the information pits by forming a projection on a substrate of the recording medium.

9. A method for reproducing information from a recording medium having an arrangement, along a track, of information pits of at least three kinds which are mutually different in at least one of the length along the longitudinal direction of a track and in the amount of shift from a reference position corresponding to a reference clock signal to the center position of the information pit along the longitudinal direction of a track, said method comprising steps of:

scanning the track with a light spot;

detecting, in synchronization with the reference clock signal, the light amount distribution of one of reflected and transmitted light when an information pit is irradiated by the light spot; and reproducing information by identifying the kinds of information pits based on the detected light amount distribution.

10. An apparatus for reproducing information from a recording medium having an arrangement, along a track, of information pits of at least three kinds which are mutually different in at least one the length along the longitudinal direction of a track and in the amount of shift from a reference position corresponding to a reference clock signal to the center position of the information pit in the longitudinal direction of a track, said apparatus comprising:

means for scanning the track with a light spot;

a photodetector for detecting, in synchronization with the reference clock signal, the light amount distribution of one of reflected and transmitted light when an information pit is irradiated by the light spot; and an information recognition circuit for reproducing the information by identifying the kinds of the information pits based on the detected light amount distribution.

11. An apparatus according to claim 10, wherein said information recognition circuit comprises memory means for storing the light amount distributions obtained from the information pits of different kinds, and identification means for identifying the kinds of the information pits by calculating a correlation between the light amount distribution obtained by said photodetector and that stored in said memory means.

12. An apparatus according to claim 10, wherein said information recognition circuit comprises a neural network.

13. An apparatus according to claim 12, wherein said photodetector has a light receiving face divided into plural elements, said neural network comprises a circuit for weighting the outputs from said plural elements, and a circuit for identifying the kind of an information pit by effecting a calculation on the weighted plural outputs.

14. An apparatus according to claim 13, wherein the information pit comprises a projection formed on a substrate of the recording medium, with one of a height and a depth equal to $\lambda/4n$ wherein n is the refractive index of the substrate while $\lambda$ is the wavelength of the light spot.

15. An apparatus according to claim 13, wherein the information pit comprises a recess formed on a substrate of the recording medium, with one of a height and a depth equal to $\lambda/4n$ wherein n is the refractive index of the substrate while $\lambda$ is the wavelength of the light spot.

16. A method of encoding information into at least three kinds of codes, and recording an arrangement of the at least three kinds of codes on a recording medium having tracks, said method comprising the steps of:

making the codes of the information to respectively correspond to information pits of at least three kinds; and forming the information pits corresponding to the codes on the recording medium, in an arrangement along the tracks, wherein the information pits of different kinds can be mutually identified by the distance along the longitudinal direction of a track between the center of a pit on the recording medium and a reference position determined on the medium according to a reference clock signal.

17. A method of encoding information into at least three kinds of codes, and recording an arrangement of the at least three kinds of codes on a recording medium having tracks, said method comprising the steps of:

setting, on the tracks, reference positions at predetermined intervals corresponding to a reference clock signal; and recording information pits, corresponding to the codes of the information, respectively on the reference positions, wherein the information pits corresponding to different codes are mutually different in the length along the longitudinal direction of the tracks, and the lengths of the respective pits along the longitudinal direction of the tracks are smaller than the diameter of a light spot with which the recording medium is irradiated.

18. An apparatus for encoding information into at least three kinds of codes, and recording an arrangement of the at least three kinds of codes on a recording medium having tracks, said apparatus comprising:

means for making the codes of the information to respectively correspond to information pits of at least three kinds; and means for forming the information pits corresponding to the codes on the recording medium, in an arrangement along the tracks, wherein the information pits of different kinds can be mutually identified by the length along the longitudinal direction of a track, and the distance along the longitudinal direction of a track between the center of a pit on the recording medium and a reference position determined on the medium according to a reference clock signal.

19. An apparatus for encoding information into at least three kinds of codes, and recording an arrangement of the at least three kinds of codes on a recording medium having tracks, said apparatus comprising:

means for setting, on the tracks, reference positions at predetermined intervals corresponding to a reference clock signal; and means for recording information pits, corresponding to the codes of the information, respectively on the reference positions, wherein the information pits corresponding to different codes are mutually different in the amount of shift from the reference position to the center position of the pits in the longitudinal direction of the tracks.

20. An apparatus for encoding information into at least three kinds of codes, and recording an arrangement of the at least three kinds of codes on a recording medium having tracks, said apparatus comprising:

means for setting, on the tracks, reference positions at predetermined intervals corresponding to a reference clock signal; and means for recording information pits, corresponding to the codes of the information, respectively on the reference positions, wherein the information pits corresponding to different codes are mutually different in the length along the longitudinal direction of the tracks, and the lengths of the respective pits along the longitudinal direction of the tracks are smaller than the diameter of a light spot with which the recording medium is irradiated.

21. An information recording medium comprising:

a control region including clocking pits for taking timing for reproduction of information; and an information region on which information pits of at least three kinds, corresponding to codes of at least three kinds, which are obtained by encoding information, are adapted to be recorded along the tracks, wherein the information pits recorded on the recording medium can be mutually identified by the length along the longitudinal direction of a track, and the distance along the longitudinal direction of a track between the center of a pit on the recording medium and a reference position determined on the recording medium according to a reference clock signal produced by detecting the clocking pits.

22. An information recording medium comprising:

a control region including clocking pits for taking timing for reproduction of information; and an information region on which information pits of at least three kinds, corresponding to codes of at least three kinds, which are obtained by encoding information, are adapted to be recorded along the tracks, wherein the information pits recorded on the recording medium can be mutually identified by the distance along the longitudinal direction of a track between the center of a pit on the recording medium and a reference position determined on the recording medium according to a reference clock signal produced by detecting the clocking pits.

23. An information recording medium comprising:

a track along which information is recorded; and an information region on which information pits of at least three kinds, corresponding to codes of at least three kinds which are obtained by encoding information, are adapted to be recorded along the tracks, wherein the lengths of the respective information pits along the longitudinal direction of the tracks are smaller than the diameter of a light spot with which said information region is irradiated, and the information pits recorded on the recording medium can be mutually identified by a difference in the lengths of the pits along the longitudinal direction of a track.

24. A method for reproducing information from a recording medium having an arrangement, along a track, of information pits of at least three kinds which are mutually different in at least one of the length along the longitudinal direction of a track and in the amount of shift from a reference position corresponding to a reference clock signal to the center position of the information pit along the longitudinal direction of a track, said method comprising the steps of:

scanning the track with a light spot;

detecting, in synchronization with the reference clock signal, one of reflected and transmitted light when an information pit is irradiated by the light spot; and reproducing information by identifying the kinds of information pits based on the detected light quantity change.

25. An apparatus for reproducing information from a recording medium having an arrangement, along a track, of information pits of at least three kinds which are mutually different in at least one of the length along the longitudinal direction of a track and in the amount of shift from a reference position corresponding to a reference clock signal to the center position of the information pit in the longitudinal direction of a track, said apparatus comprising:

means for scanning the track with a light spot;

a photodetector for detecting, in synchronization with the reference clock signal, one of reflected and transmitted light when an information pit is irradiated by the light spot; and an information recognition circuit for reproducing the information by identifying the kinds of the information pits based on the detected light quantity change.

* * * * *

UNITED STATES PATENT AND TRADEMARK OFFICE
CERTIFICATE OF CORRECTION

PATENT NO. : 5,555,231
DATED : September 10, 1996
INVENTOR(S) : MASAKUNI YAMAMOTO It is certified that error appears in the above-indentified patent and that said Letters Patent is hereby corrected as shown below:

COLUMN 6:

Line 45, "4 min." should read --4 mm.--

COLUMN 7:

Line 7, "In" should be deleted.

COLUMN 8:

Line 61, "of" should be deleted.

COLUMN 15:

Line 24, "one" should read --one of--.

Signed and Sealed this

Twenty-fifth Day of February, 1997

Attest:

BRUCE LEHMAN

Attesting Officer

Commissioner of Patents and Trademarks